United States Patent
Stahl et al.

(10) Patent No.: US 9,571,006 B2
(45) Date of Patent: Feb. 14, 2017

(54) MULTI-LEVEL HALF BRIDGE WITH SEQUENCED SWITCH STATES

(71) Applicant: TQ-SYSTEMS GMBH, Seefeld (DE)

(72) Inventors: Rudiger Stahl, Herrsching (DE); Alexander Lichte, Tutzing (DE)

(73) Assignee: TQ-Systems GmbH, Seefeld (DE)

( * ) Notice: Subject to any disclaimer, the term of this patent is extended or adjusted under 35 U.S.C. 154(b) by 131 days.

(21) Appl. No.: 14/493,536

(22) Filed: Sep. 23, 2014

(65) Prior Publication Data
US 2015/0009734 A1 Jan. 8, 2015

Related U.S. Application Data

(63) Continuation of application No. PCT/EP2013/000583, filed on Feb. 28, 2013.

(30) Foreign Application Priority Data

Mar. 23, 2012 (DE) .................. 10 2010 005 974

(51) Int. Cl.
H02M 7/483 (2007.01)
H02M 7/5387 (2007.01)

(52) U.S. Cl.
CPC ......... *H02M 7/53871* (2013.01); *H02M 7/483* (2013.01)

(58) Field of Classification Search
CPC ........ H02M 7/483; H02M 7/49; H02M 7/501; H02M 2001/0074; H02M 2001/0067; H02M 2001/0077
See application file for complete search history.

(56) References Cited

U.S. PATENT DOCUMENTS

| | | | | |
|---|---|---|---|---|
| 7,471,532 B1* | 12/2008 | Salama | .................. | H02M 7/483 363/132 |
| 2011/0280052 A1* | 11/2011 | Al-Haddad | ........... | H02M 7/483 363/84 |
| 2012/0218795 A1* | 8/2012 | Mihalache | ............ | H02M 7/487 363/97 |

OTHER PUBLICATIONS

Khazraei, Mostafa; Sepahvand, Hossein; Corzine, Keith; Ferdowsi, Mehdi; Active Capacitor Voltage Balancing in Single-Phase Flying-Capacitor Multilevel Power Converters, Feb. 2012, IEEE Transactions on Industrial Electronics, vol. 59, No. 2, pp. 769-778.*
International Search Report with written opinion for PCT/EP2013/00583, dated Jun. 3, 2013, 9 pages.
Jih-Sheng Lai and Fang Zheng Peng , Multilevel Converters—A New Breed of Power Converters, IEEE Transactions on Industry Applications, Jun. 1, 1996, pp. 509 to 517, vol. 32, No. 3, Piscataway, New Jersey.
Chunmei Feng, Jun Liang, and Vassilios G. Agelidis, Modified Phase-Shifted PWM Control for Flying Capacitor Multilevel Converters, IEEE Transactions on Power Electronics, Jan. 1, 2007, pp. 178 to 185, vol. 22, No. 1, Piscataway, New Jersey.

(Continued)

*Primary Examiner* — Harry Behm
(74) *Attorney, Agent, or Firm* — Myers Wolin, LLC

(57) ABSTRACT

A method for the operation of an electrical circuit taking the form of a multi-level half-bridge (MLHB), and a multi-level half-bridge designed for implementation of the method, comprising two connections to which a bridge voltage is applied and which are connected via two symmetrical branches meeting at a central connection, wherein a central voltage is applied to the central connection against the potential of one of the connections.

27 Claims, 16 Drawing Sheets

(56) References Cited

OTHER PUBLICATIONS

S.J. Watkins and L. Zhang, Modelling and Control of a Flying-Capacitor Inverter, 9th European Conference on Power Electronics and Applications, EPE 2001, Jan. 1, 2001, Brussels, Belgium, 10 pages.

* cited by examiner

| Voltage level N | Switched state Z | \multicolumn{6}{c}{State of the switching elements $T_i$ (0 = open / 1 = closed)} | \multicolumn{6}{c}{Charging of the capacitors relative to $I_M$ ("+" = charging at pos. $I_M$ / "-" = discharging at pos. $I_M$)} | $U_M/U_{Br}$ |
|---|---|---|---|---|---|---|---|---|---|---|---|---|---|
| | | $T_1$ | $T_2$ | $T_3$ | $T_4...T_{n-2}$ | $T_{n-1}$ | $T_n$ | $C_1$ | $C_2$ | $C_3...C_{n-3}$ | $C_{n-2}$ | $C_{n-1}$ | |
| 0 | $Z_1=...=Z_n$ | 0 | 0 | 0 | 0 | 0 | 0 | | | | | | 0 |
| 1 | $Z_1$ | 1 | 0 | 0 | ... | 0 | 0 | - | | | | | 1/n |
| 1 | $Z_2$ | 0 | 1 | 0 | ... | 0 | 0 | + | - | | | | 1/n |
| 1 | $Z_3$ | 0 | 0 | 1 | ... | 0 | 0 | | + | ... | | | 1/n |
| 1 | $Z_4...Z_{n-2}$ | 0 | 0 | 0 | ... | 0 | 0 | | | ... | | | 1/n |
| 1 | $Z_{n-1}$ | 0 | 0 | 0 | ... | 1 | 0 | | | ... | + | - | 1/n |
| 1 | $Z_n$ | 0 | 0 | 0 | ... | 0 | 1 | | | ... | | + | 1/n |
| 2 | $Z_1$ | 1 | 1 | 0 | ... | 0 | 0 | + | - | | | | 2/n |
| 2 | $Z_2$ | 0 | 1 | 1 | ... | 0 | 0 | | + | ... | | | 2/n |
| 2 | $Z_3$ | 0 | 0 | 1 | ... | 0 | 0 | + | | ... | | | 2/n |
| 2 | $Z_4...Z_{n-3}$ | 0 | 0 | 0 | ... | 0 | 0 | | | ... | | | 2/n |
| 2 | $Z_{n-2}$ | 0 | 0 | 0 | ... | 1 | 0 | | | ... | + | | 2/n |
| 2 | $Z_n$ | 1 | 0 | 0 | ... | 0 | 1 | - | | ... | | + | 2/n |
| 3 | $Z_1$ | 1 | 1 | 1 | ... | 0 | 0 | + | | ... | | | 3/n |
| 3 | $Z_2$ | 0 | 1 | 1 | ... | 0 | 0 | | + | ... | | | 3/n |
| 3 | $Z_3$ | 0 | 0 | 1 | ... | 0 | 0 | | | ... | | | 3/n |
| 3 | $Z_4...Z_{n-2}$ | 0 | 0 | 0 | ... | 0 | 0 | | | ... | + | | 3/n |
| 3 | $Z_{n-1}$ | 0 | 0 | 0 | ... | 1 | 0 | - | | ... | + | | 3/n |
| 3 | $Z_n$ | 1 | 0 | 0 | ... | 0 | 1 | | | ... | | + | 3/n |
| L | $Z_i$ | \multicolumn{6}{l}{For $i=1...n$: $T_i = 1$ if ($t \geq i$ and $i < L+t$) or $i < L+i-n$, otherwise $T_i = 0$} | \multicolumn{6}{l}{$C_C = "+"$ if $0<L<n$ and $C=Z-1$, $C_C = "-"$ if $0<L<n$ and ($C=L+Z-1$ or $C=L+Z-1-N$)} | L/n |
| n-1 | $Z_1$ | 1 | 1 | 1 | ... | 1 | 0 | + | | ... | | - | (n-1)/n |
| n-1 | $Z_2$ | 0 | 1 | 1 | ... | 1 | 1 | - | + | ... | | | (n-1)/n |
| n-1 | $Z_3$ | 1 | 0 | 1 | ... | 1 | 1 | | - | ... | | | (n-1)/n |
| n-1 | $Z_4...Z_{n-2}$ | ... | ... | ... | ... | ... | ... | ... | ... | ... | ... | ... | (n-1)/n |
| n-1 | $Z_{n-1}$ | 1 | 1 | 1 | ... | 0 | 1 | | | ... | + | - | (n-1)/n |
| n-1 | $Z_n$ | 1 | 1 | 1 | ... | 1 | 1 | + | | ... | - | + | (n-1)/n |
| n | $Z_1=...=Z_n$ | \multicolumn{6}{l}{For all voltage levels L: state of the switching elements is $T_{n+1}$ to $T_{2n}$, $T_{n+i} = 1$ if state $T_i = 0$, otherwise $T_{n+i} = 0$; expressed otherwise: $T_{n+i} = $ not $T_i$} | | | | | | 1 |

Fig. 2
(Table)

US 9,571,006 B2

MULTI-LEVEL HALF BRIDGE WITH SEQUENCED SWITCH STATES

CROSS REFERENCE TO RELATED APPLICATIONS

This application is a continuation under 35 U.S.C. §120 of International Application PCT/EP2013/000583, filed Feb. 28, 2013, which claims priority to German Application 10 2012 005 974.4, filed Mar. 23, 2012, the contents of each of which are incorporated by reference herein.

FIELD OF THE INVENTION

The present invention relates to a method for operation of an electrical circuit in the form of a multi-level half-bridge as well as to an electrical circuit set up for implementation of such a method.

BACKGROUND

What is understood by a multi-level half-bridge here is an electrical circuit that has a connection of two terminals, between which a bridge voltage is present, via two branches meeting at a central terminal, wherein a central voltage relative to the potential of one of the aforesaid terminals is present at the central terminal and wherein the branches configured symmetrically relative to the central terminal respectively have a predetermined number n of switching elements connected in series. These connection points between each two adjacent switching elements of the first branch are respectively connected via a capacitor with the connection points, symmetrically situated relative to the central terminal, between each two switching elements of the second branch. The switching elements of the multi-level half-bridge can be switched to various switched states by using a control unit.

Such a multi-level half-bridge, which is frequently also referred to as a "flying capacitor multi-level converter" or "flying capacitor multi-level converter/inverter" is known in principle from the prior art, wherein an (external) bridge voltage is applied in this case to the (outer) terminals of the multi-level half-bridge and thus the central terminal is used to tap the central voltage as an output voltage.

Corresponding circuits and methods for operation thereof are known, for example, from the following publications:

"Modified Phase-Shifted PWM Control for Flying Capacitor Multilevel Converters"; Feng, C.; Liang. J.; Agelidis V. G.; IEEE Transactions on Power Electronics, Vol. 22, No. 1, January 2007, pages 178-185 and "Modelling and Control of a Flying-Capacitor Inverter"; Watkins, S. J.; Zhang, L.; School of Electronic and Electrical Engineering, University of Leeds, UK, EPE 2001, Graz.

The term "flying capacitors" is used inasmuch as the respective potential thereof—depending on the actual switched state of the individual switching elements—is constantly shifting relative to the reference potential present at one terminal of the multi-level half-bridge. It is of advantage in this respect that the voltages to be switched by the individual switching elements can be reduced to a fraction of the total voltage to be switched, whereby the requirements for their design are reduced. It is further known that, for given bridge voltage, and depending on the selected charging level of the capacitors, a plurality of different switched states exists for each central voltage—which can be predetermined at various voltage levels—provided this is not 0 or does not correspond to the bridge voltage, and that these states respectively compose the same central voltage redundantly, albeit as a function of the actual switched state of the switching elements, by drawing on various capacitors of the circuit. Nevertheless, the operation of such a half-bridge—even with a substantially uniform load at the central output of the half-bridge—proves to be extremely complex, since the various switched states of the switching elements have a different influence on the charged states of the individual capacitors and since—in the case of too high or too low charging of one of the capacitors—one or more switching elements or capacitors may be destroyed.

Multi-level half-bridges of the type mentioned in the introduction, inasmuch as they are used at all in practice, serve mainly for switching voltages in the high power range. The complex structure and operation of such a multi-level half-bridge has made their use in the medium and low power ranges seem less attractive, however.

According to the conventional prior art, voltage or current converters in the low and medium power range up to the order of magnitude of several hundred kilowatts power are usually designed in the form of standard step-down converters/buck converters, step-up converters/upward converters/boost converters, inverse converters/buck-boost converters, SEPIC converters, Ćuk circuits Ćuk converters, double inverters, zeta converters, forward converters or flyback converters as two-step converters.

In all aforesaid topologies, the switched voltage is reversed between two voltage levels. Therefore these topologies are also referred to as two-step converter topologies. They are subject to harmonics, all the more so the steeper the switching flanks are, to EMC interferences, conversion losses at parasitic capacitances, remagnetization losses in inductors and ohmic losses at the current-carrying components, which are even further intensified by the harmonics and associated high frequencies (skin effect).

Therefore so-called multi-level converters are sometimes used in power engineering, for voltage or current converters for high powers, which typically lie in the megawatt range. Mostly modular or cascadable multi-level converters or cascaded multi-step inverters with separate DC intermediate circuits are used for this purpose, wherein several modules with their own DC intermediate circuits and charge-storage units, acting as two-point networks on the power side, are connected together in series and as half-bridges. These converters are well suited for high powers and are characterized by modularity, good scalability, reduced harmonics, good EMC properties and high efficiency. The structure and control for them are relatively complex, and so these systems are not suitable for lower power classes for the time being.

Flying capacitor multi-level converters in the form of a multi-level half-bridge of the type already mentioned in the introduction are also known, as are so-called diode-clamped multi-level converters.

As already mentioned for the flying capacitor multi-level converters, these are not of as particularly flexible and modular construction as the other aforesaid modular multi-level converters, and so they are not used in practice in power engineering. Moreover, these converters require relatively complex driving and voltage monitoring at the storage capacitors, and so heretofore they have been used hardly or not at all in practice, especially for low or medium powers.

SUMMARY

Against the background of the prior art explained in the foregoing, it is the object of the present invention to provide a method for operation of an electrical circuit in the form of the multi-level half-bridge described in the introduction ("multi-level flying capacitor converter") as well as a multi-level half-bridge appropriately set up for implementation of the method, so that the operation of the multi-level half-bridge can be made as simple and stable as possible by provision of a simplified switching scheme.

This object is achieved with a method for operation of an electrical circuit and an electrical circuit in the form of a multi-level half-bridge according to the independent claims.

Further advantageous aspects of the present invention will become evident from the dependent claims, which relate not only to more extensive improvements of the invention but in particular also to various system configurations, in which at least one inventive multi-level half-bridge may be used.

BRIEF DESCRIPTION OF THE DRAWINGS

For better clarity, the present invention and its preferred improvements are explained in more detail hereinafter on the basis of the exemplary embodiments illustrated in the drawings, wherein:

FIG. 2 shows a table containing the switched states to be preferably selected in the context of an exemplary embodiment of the invention for various voltage levels at the central output, including more extensive information thereon.

DETAILED DESCRIPTION OF THE PREFERRED EMBODIMENTS

Figure 1:
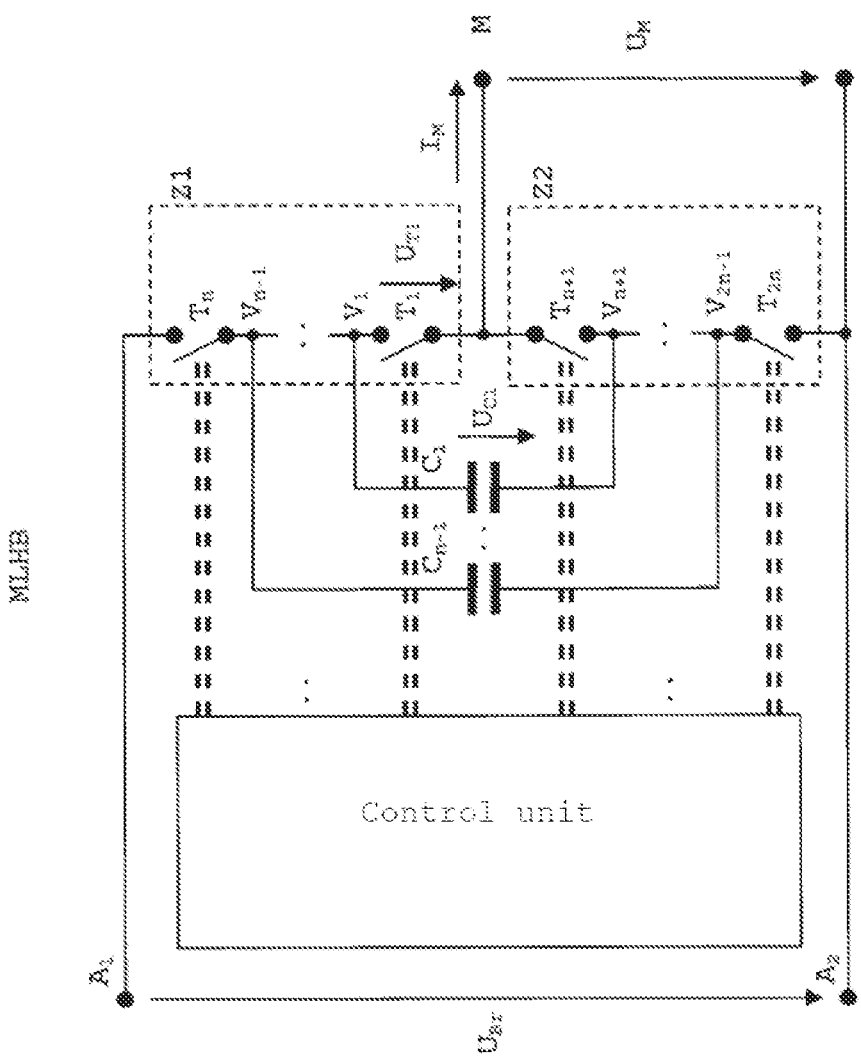
FIG. 1 shows an exemplary embodiment of an inventive multi-level half-bridge with in total 2n switching elements and (n−1) capacitors.

FIG. 1 illustrates an exemplary embodiment of an inventive electrical circuit in the form of a multi-level half-bridge MLHB. The circuit has a connection, via two branches Z1, Z2 meeting at a central terminal M, of terminals $A_1$, $A_2$, to which a bridge voltage $U_{Br}$ is applied, wherein a central voltage $U_M$ relative to the potential of one of the terminals $A_1$, $A_2$ (in the present case according to FIG. 1, relative to the lower terminal $A_2$) is present or can be tapped at central terminal M. In the context of the present invention, therefore, either the outer terminals $A_1$, $A_2$ of the multi-level half-bridge may be used as the input side for injection of an (external, i.e. predetermined) bridge voltage $U_{Br}$, or the central terminal may be used as the input side for injection of an (external, i.e. predetermined) central voltage $U_M$ relative to one of the terminals $A_1$ or $A_2$. The branches Z1, Z2 formed symmetrically relative to central terminal M respectively have a number n (e.g. 2, 3, 4, 5, 6 or more) of switching elements $T_1, \ldots, T_n, T_{n+1}, \ldots, T_{2n}$ connected in series, wherein the connection points ($V_i$; $i \in \{1, \ldots, n-1\}$) between each two adjacent switching elements $T_i$, $T_{i+1}$ of the first branch Z1 are respectively connected via a capacitor $C_i$ with the connection points $V_{n+i}$, disposed symmetrically relative to the central terminal M, between each two switching elements $T_{n+i}$, $T_{n+i+1}$ of the second branch. As is immediately obvious from FIG. 1, this can be understood to the effect that each connection point $V_i$ of first branch Z 1 is connected via exactly one capacitor $C_i$ with the connection point $V_{n+1}$, symmetrically disposed relative thereto, of second branch Z2, wherein such connection points $V_1, \ldots, V_{n-1}; V_{n+1}, \ldots, V_{2n-1}$ exist in each branch n−1.

Switching elements $T_1, \ldots, T_{2n}$ are switchable to various switched states $Z_i$ by using the control unit illustrated in FIG. 1. In this regard, a switched state $Z_i$ therefore corresponds to a 2n-tuple containing the respective switched state (0 for open or inactive; 1 for closed or active) of all switching elements $T_1, \ldots, T_{2n}$. Inventive multi-level half-bridge MLHB or its control unit is set up for implementation of the inventive method explained in more detail hereinafter.

The inventive method for operation of the electrical circuit explained in the foregoing in the form of a (flying capacitor) multi-level half-bridge is characterized by the following steps:

a. At given bridge voltage $U_{Br}$, specification of a desired central voltage $U_M$, which is selected exclusively from n+1 various voltage levels N corresponding to p times the value of the n-th part of the bridge voltage ($U_M = p/n \times U_{Br}$), wherein p is an integer such that $0 <= p <= n$, or at given central voltage $U_M$ with $U_M \neq 0$, specification of a desired bridge voltage $U_{Br}$, which is selected exclusively from n different voltage levels corresponding to n times the value of the p-th part of the central voltage ($U_{Br} = n/p \times U_M$), wherein p is an integer such that $1 <= p <= n$, b. Operation of the circuit in a regulated mode, as long as a new central voltage $U_M$ or a new bridge voltage $U_{Br}$ will not be selected in accordance with step A) from the said voltage levels, in which regulated mode initially all capacitors $C_i$ are charged to an integral multiple of the n-th part of the bridge voltage $U_{Br}$, so that the voltage $U_{Ci}$ at each capacitor $C_i$ takes on the value $U_{Ci}=i/n \times U_{Br}$, each switching element $T_1, \ldots, T_{2n}$ in opened state is respectively exposed to the n-th part of the bridge voltage $U_{Br}$, and the desired central voltage $U_M$ or the desired bridge voltage $U_{Br}$, except in the cases of $U_M=0$ or $U_M=U_{Br}$, is maintained by establishment of a sequence, grouped into switching cycles, of various switched states $Z_i$ of the switching elements $T_1, \ldots, T_{2n}$ respectively providing the desired central voltage $U_M$, wherein each switching cycle comprises a predetermined number of various switched states $Z_i$, which at constant load on the multi-level half-bridge MLHB are respectively active for the same duration and for the same number of times over a complete switching cycle, and also are selected in such a way that each capacitor $C_1, \ldots, C_{n-1}$ is charged and discharged for the same duration and for the same number of times in each switching cycle.

In this regard the inventive method starts in particular from two possible scenarios, in which either the bridge voltage $U_{Br}$ or the central voltage $U_M$ is predetermined by suitable injection of an input voltage. For this purpose it is obviously not imperative to inject the input voltage directly between the outer terminals $A_1$, $A_2$ of the half-bridge or at the central terminal M relative to terminal $A_1$ or $A_2$. To the contrary, the bridge voltage or the central voltage may also be predetermined indirectly by injection at other points of a switching topology, which if necessary may be expanded.

Depending on this, a desired central voltage (between central terminal M and one of the outer terminals $A_1$ or $A_2$) or a desired bridge voltage (between the outer terminals $A_1$, $A_2$) must then be predetermined in accordance with step (A)—from a limited number of predetermined voltage levels. Then, in accordance with step (B)—advantageously by establishment of a sequence, to be chosen suitably, of switched states $Z_i$ of switching elements $T_1, \ldots, T_{2n}$—the capacitors $C_1, \ldots, C_{n-1}$ are first charged to specifically predetermined voltage levels and then the multi-level half-bridge MLHB—in a mode that is regulated if necessary—is maintained by suitable switching cycles at the respective desired (output) voltage level, until a new value is predetermined for this. Under these conditions, the capacitors always remain equally charged at constant load on the half-bridge, while obviously the load present at central terminal M or at outer terminals $A_1$, $A_2$ in particular is therefore to be understood as the load on the multi-level half-bridge MLHB.

In the context of the present invention, therefore, an operating scheme that can be realized particularly simply by hardware and/or software is provided in generally applicable manner for multi-level half-bridges of the type explained in the foregoing with an arbitrarily predetermined number of switching elements, which scheme always ensures in regulated mode at (substantially) constant load that the individual capacitors—after completion of each switching cycle—are recharged to their initial voltage in accordance with the set target value. This is made possible by the fact that each central or bridge voltage "selected" in accordance with step (A) from a limited number of predeterminable voltage levels can be adjusted by a plurality of different switched states $Z_i$, in which various of the existing capacitors are either charged or discharged, wherein the switched states in question are selected and respectively activated for an equally long time interval in the inventive sense in a regulated mode at constant load such that, after completion of each switching cycle, each capacitor subjected to a charging or discharging process has been charged and discharged for the same duration during the switching cycle.

The subject matter of the invention is therefore in particular simplification of the drive and voltage regulation as well as—in improvements of the invention discussed further on—minimization of the switching losses during switching of the switching elements and charge-reversal losses of the capacitors by using a switching sequence optimized for this purpose, achievement of particularly simple voltage monitoring at the storage capacitors, implementation of a method for further reduction of the switching losses during switching of the switching elements by switching on or switching off at zero voltage or zero current and the novel switching technology for application of flying capacitor multi-level half-bridges for voltage or current converters, so that these—especially in view of the switching sequences that can be simply achieved—can also be used in a low and medium power range.

On the whole, by comparison with the converters of standard type used heretofore in the low and medium power range, clearly improved performance is achieved in regard to reduced switching voltage at the individual switching elements $T_1, \ldots T_n$ ($\max(U_{Ti})=1/n \times U_{Br}$ in regulated mode), whereby the use of smaller switching elements (and inductors—see below) is made possible, reduced harmonics content of the switched currents/voltages, reduced skin effect, lower reactive current component, smaller current ripple, better EMC behavior, reduction of ohmic losses, better efficiency, and good scalability, among other factors because of high proportion of identical parts.

By virtue of the simplifications and optimizations achieved in the context of the inventive method, multi-level half-bridges of the inventive type (as well as switching topologies, containing these, of the type described in more detail further on) can be used advantageously for a large number of power electronics applications. This relates to motor controllers, e.g. for rotating-current motors, stepper motors or DC motors, converters and inverters, e.g. for service in photovoltaic, wind and/or hydroelectric power applications as well as use thereof in power network components, in DC/DC converters and in charging applications (e.g. in chargers).

The inventive simplification is achieved in particular by the given choice or specification of the voltage levels (at the central output or at the outer terminals of the half-bridge and at the individual capacitors), the choice of the switching sequence as well as more extensive optimizations of the type described hereinafter. Furthermore, minimization of charge-reversal processes of the capacitors and charge-reversal losses as well as minimization of the necessary switching frequency and of switching losses can be achieved by the optimization of the switching sequence applied according to the invention. Another associated benefit is a longer useful life of the components being used as well as simplified cooling as a result of the reduced power loss compared with the prior art, in which case the distribution of the power loss over a plurality of individual components also prevents the development of hot spots and simplifies cooling even more.

The switching elements of an inventive multi-level half-bridge are advantageously transistors (if necessary with a diode connected in parallel therewith in suitable direction or integrated into the switching element, also known as reverse diode) or thyristors that can be switched off. In the context of the invention, it is also possible in particular to use MOSFETs with preferably low RDS-on (resistor between "drain" and "source" in closed/active state), JFETs, especially SiC-based, IGBTs, IGCTs and GTOs as switching elements.

The control unit may have the form of a microcontroller, DSP ("digital signal processor"), FPGA ("field programmable gate array") CPLD ("complex programmable logic device") or ASIC ("application-specific integrated circuit"), wherein the use of FPGAs, CPLDs or ASICs for the purpose of driving the switching elements is particularly advantageous, since herewith signal processing that is particularly fast and activation of the switching elements that is particularly fast and exact in time can be achieved. In addition, power drivers are usually also used for driving the switching elements.

An example for the switched states that can be selected in each switching cycle in the context of the invention and adjusted therein successively in a switching sequence is presented in the table of FIG. 2.

For each voltage level N (see the first column of the table), to which a defined central voltage $U_M$ or bridge voltage $U_{Br}$ in accordance with the last column of the table is always allocated, this shows in total n switched states $Z_1$ to $Z_n$, with which—with the exception of the zeroth and n-th voltage level corresponding to $U_M=0$ and $U_M=U_{Br}$—an identical central voltage at the central terminal (for predetermined bridge voltage) or an identical bridge voltage (for predetermined central voltage) can be respectively generated redundantly by various switched states $Z_i$ of the transistors.

Even though, as was explained hereinabove, each switched state $Z_i$ can be characterized in principle as a 2n-tuple by indication of the state of all 2n switching elements, an unambiguous characterization of the switched states $Z_i$ can already be achieved by indication of the states of the n switching elements $T_i, \ldots, T_n$ of the first branch for the switched states $Z_i$ selected in the present case according to Table 2 for each voltage level, since in the present scheme—according to the last row of the table—the states of the further switching elements $T_{n+1}, \ldots, T_{2n}$ are unambiguously derived therefrom, by the fact that the state of each switched element $T_{n+i}$ of the second branch Z2 is selected to be exactly opposite the state of the switching element $T_i$ (which is symmetrically disposed relative thereto).

The table in FIG. 2 further shows, for each switched state $Z_i$ of each voltage level N, which of the capacitors $C_i$ is charged or discharged in the respective switched state $Z_i$. Capacitors for which no entry appears in the corresponding rows of the table are neither charged nor discharged in the associated switched stage $Z_i$.

In the context of the present invention, therefore, each switching cycle for maintaining a central voltage selected according to step (A) at the central terminal can consist, in regulated mode, i.e. the inventively regulated operation of the multi-level half-bridge at constant load, of a switching sequence of various switched states, in which all switched states $Z_i$ to $Z_n$ (in principle in arbitrary sequence)—associated with the voltage level in question—can be respectively activated once for a respectively identical period. This is followed continuously by further switching cycles of the type described in the foregoing, as long as the voltage level in question is to be maintained. As long as the load on the half-bridge then remains (substantially) constant, no charge reversals of the capacitors take place on average over time, as can be clearly inferred from the table, and so a stable operating state of the multi-level half-bridge is assured.

In a first preferred improvement of the inventive method, it is provided that, in step B), at each predetermined voltage level N for the desired central voltage $U_M$ or the desired bridge voltage $U_{Br}$, except for $U_M=0$ and $U_M=U_{Br}$, each switching cycle comprises exactly n switched states, which are selected such that, at constant load in each switching cycle, each capacitor $C_1, \ldots, C_{n+1}$ is charged and discharged exactly one time, and that, in each switched state of a switching cycle, respectively at most two capacitors are charged and/or discharged simultaneously. This specific selection of the switched states $Z_i$ to be maintained during each switching cycle, which selection is maintained, for example, by the switched states indicated in the table of FIG. 2, guarantees a very low number of capacitor charge reversals, and so especially the charge reversals of the individual capacitors that occur during a switching cycle and the resulting minimum voltage fluctuation ("voltage ripple") generated thereby in the output signal of an inventive multi-level half-bridge are reduced. The ohmic losses at the capacitors are also reduced to a minimum degree in this way.

A further preferred improvement of the invention provides that the order of switched states $Z_i$ within a switching cycle is selected in such a way that, during the changeover between two successive switched states $Z_i$ of a voltage level, always only at most two switching elements $T_1, \ldots, T_n$; $T_{n+1}, \ldots, T_{2n}$ of each branch Z1, Z2 are respectively switched on and/or off, meaning in particular that exactly one switching element is switched on and exactly one switching element is switched off per branch Z1, Z2. As an example, this can be achieved by the switched states $Z_i$ predetermined for each voltage level in the table of FIG. 2 when these are activated (cyclically) in the order of their numbering or in the inverse order. In this way the number of switching processes necessary at the individual switching elements for operation of the multi-level half-bridge is appreciably reduced or minimized, thus also minimizing the switching losses.

Further in the context of the present invention, it is provided for optimization of the switching sequence that, during a changeover between the two adjacent voltage levels of the central voltage $U_M$ or of the bridge voltage $U_{Br}$, the first switched state $Z_i$ to be adjusted for the new voltage level is selected as a function of the switched state $Z_j$ adjusted previously for the other voltage level, in such a way that, during the changeover between the said switched states, respectively only one switching element $T_1, \ldots, T_{2n}$ per branch Z1, Z2 is reversed, while once again, preferably in the repeated changeover between two adjacent voltage levels, respectively a switching element $T_1, \ldots, T_{2n}$ other than that in the previous changeover is reversed per branch Z1, Z2.

In yet another advantageous improvement in this respect, the switched states $Z_1, \ldots, Z_n$ according to the table in FIG. 2 that depend on the selected central voltage $U_M$ or on the selected bridge voltage $U_{Br}$ are used in sequence in step B) in each switching cycle provided for a defined voltage level, whereupon the objective according to the alternative embodiments mentioned in the foregoing is also met. Wherever it is stated herein that the switched states are used "in sequence", it should be obvious that, as already explained hereinabove, this takes place in the order of their numbering or in the opposite order.

This changeover between each two adjacent voltage levels can take place preferably in such a way that respectively only one switching element $T_1, \ldots, T_{2n}$ per branch Z1, Z2 is reversed, either when the switched state $Z_i$ is preserved during the changeover to the next higher voltage level and the switched state is incremented by one to the switched state $Z_{i+1}$ during the changeover to the next lower voltage level (in which case $Z_{n+1}$ to $Z_1$ is defined in the sense of a cyclic sequence) or when the switched state $Z_i$ is decremented by one to the switched state $Z_{i-1}$ during the changeover to the next higher voltage level (in which case $Z_0$ to $Z_n$ is defined) and the switched state $Z_i$ is preserved during the changeover to the next lower voltage level.

Wherever the preservation of a switched state $Z_i$ during the changeover between voltage levels is mentioned in the foregoing, this means in the given context that, for the changeover of the voltage level, that switched state with identical designation $Z_i$ of the (next higher or next lower) voltage level N is adjusted which, with respect to the state of a switching element per branch, is evidently different from the identically designated switched state of the previously activated voltage level (in this regard, see the identically designated switched states of the various voltage levels in the table of FIG. 2). Identical aspects are applicable for the required incrementing/decrementing of the said switched states.

It is further preferably provided in the context of the present invention that, in step B), during the various switched states $Z_i$ of a voltage cycle, respectively the exact bridge voltage $U_{Br}$ and the exact central voltage $U_M$ are measured and that all capacitor voltages $U_{Ci}$ are calculated from this by means of a system of linear equations after the passage through n−1 different switched states $Z_i$, as can be done in particular by software in a suitable control unit. Hereby very effective determination and continuous monitoring of all capacitor voltages is possible without having to measure these separately.

In this way it is possible in particular to ascertain whether or when—e.g. in the case of an appreciably fluctuating load during a switching cycle—undesired charge reversals of the capacitors is occurring.

An alternative calculation based on the foregoing principle and aimed at further reduced calculation complexity can make use of the fact that, at each voltage level L in the switched states $Z_1$ and $Z_{n+1-L}$ according to the table of FIG. 2, exactly the voltage of an individual capacitor is always present at the central output and therefore can be measured directly, and that, for all further switched states $Z_2$ to $Z_n$ (without the switched state $Z_{n+1-L}$), a further capacitor voltage can be respectively determined in sequence from the bridge voltage—measured during the switched state in question—and the central voltage as well as the previously measured or calculated capacitor voltages $U_{Ci}$ by simple additions and subtractions, until all capacitor voltages are known. This obviously represents a simplified way of solving the system of linear equations mentioned in the foregoing.

A further preferred variant for monitoring the charging of the individual capacitors provides that the current flowing through the half-bridge is measured by means of an ammeter $M_3$ at the central terminal or by an ammeter $M_1, M_2$ at each end of the two half-bridge branches Z1, Z2 leading to the terminals $A_1, A_2$, and that the capacitor charge reversals during a switching cycle are calculated therefrom by discrete integration ($\Delta U = I/C \times \Delta t$), which means further increased accuracy, especially if corrective adjustments have to be made to the switching sequence or to the duration of the switched states.

Figure 3:
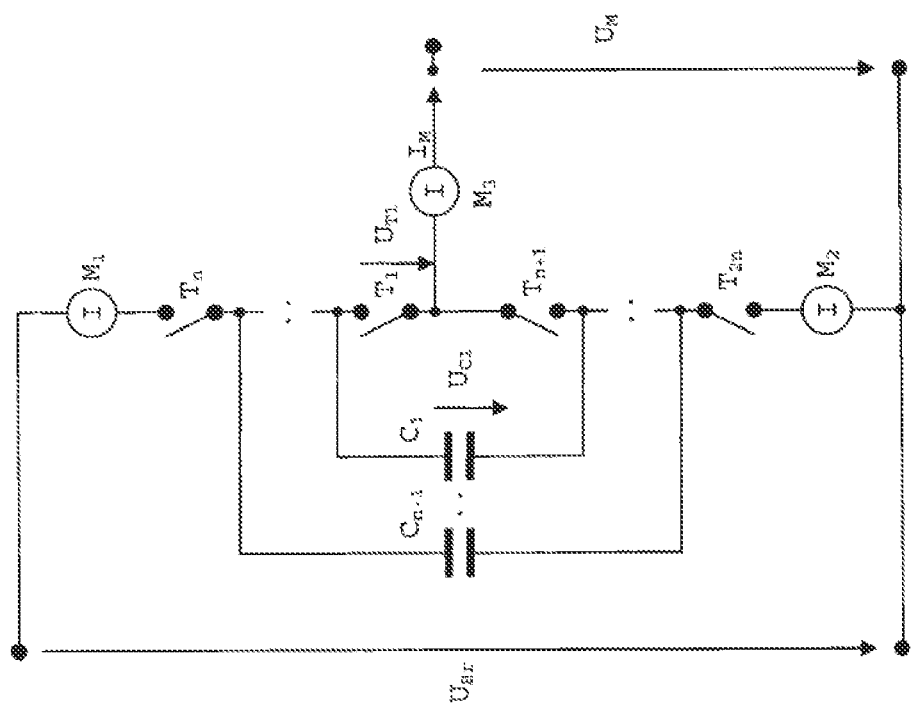
FIG. 3 shows a further exemplary embodiment of the invention with suitably arranged ammeters.

FIG. 3 illustrates, for an inventive multi-level half-bridge, the aforesaid arrangement of the ammeters $M_1, M_2, M_3$ (of appropriate design) necessary for measuring the current, wherein ammeter $M_3$ or alternatively the two ammeters $M_1$ and $M_2$ can be used.

The values calculated for the capacitor voltages $U_{Ci}$ according to the foregoing variants and/or the values calculated for the capacitor charge reversals are advantageously used in the context of the invention, especially in the case of a deviation from the target values ($U_{Ci} = i/n \times U_{Br}$), for adaptive modification of the order and/or of the duration of the switched states $Z_i$, so that in this way a mechanism that on the whole is very easy to construct is provided for effective suppression or correction of undesired capacitor charge reversals.

Figure 4:
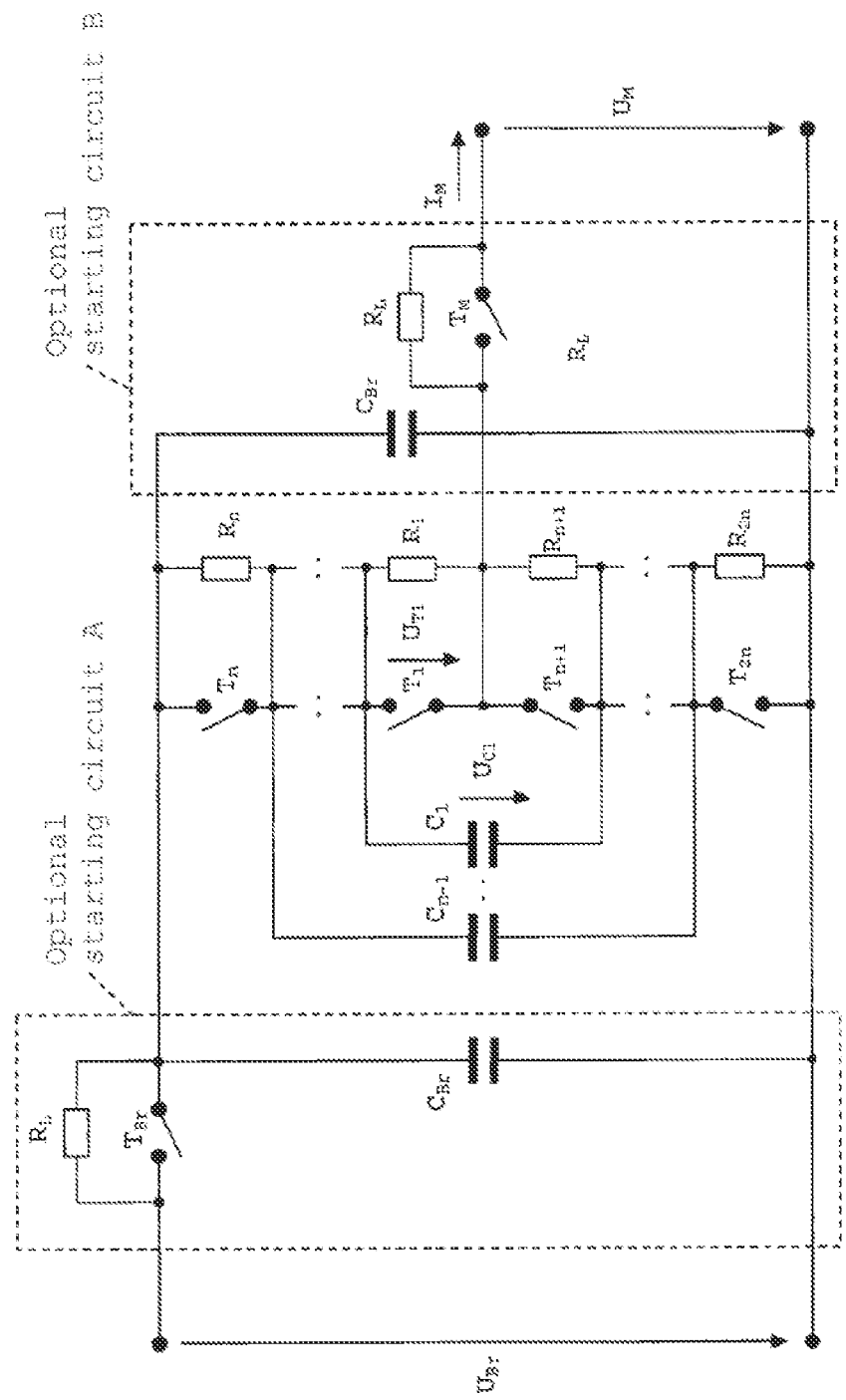
FIG. 4 shows an exemplary embodiment of an inventive multi-level half-bridge with stabilizing resistors $R_1$ to $R_{2n}$.

By means of stabilizing resistors ($R_1, \ldots, R_n$), varistors or active switching parts arranged in parallel with the switching elements $T_1, \ldots, T_{2n}$, as is illustrated for example in FIG. 4, substantially equal charging of the capacitors $C_1, \ldots, C_{n-1}$ and distribution of the blocking voltage present at the individual switching elements $T_1, \ldots, T_{2n}$ can be advantageously achieved with opened switching elements $T_1, \ldots, T_{2n}$.

Furthermore, depending on whether the bridge voltage $U_{Br}$ and/or the central voltage $U_M$ is being injected, it is additionally possible to use a starting circuit A and/or B, by means of which the multi-level half-bridge is brought slowly or incrementally to operating voltage, in order to avoid overshoot of the permissible blocking voltage at the switching elements, especially the outer switching elements $T_n$ and $T_{2n}$. Starting circuit A is preferably established by disposing a further switching element $T_{Br}$ with charging resistor $R_L$ connected in parallel as well as a bridge capacitor $C_{Br}$ parallel to the half-bridge formed from switching elements $T_1$ to $T_{2n}$ between the outer terminal $A_1$ of the half-bridge and the injected bridge voltage $U_{Br}$, in which case, during the starting phase, the switching element $T_{Br}$ is open in order to charge the capacitors and the charging current flows through the charging resistor $R_L$ and, during operation of the half-bridge, the switching element $T_{Br}$ is closed. Starting circuit B is preferably established by disposing a further switching element $T_M$ with charging resistor $R_L$ connected in parallel as well as a bridge capacitor $C_{Br}$ parallel to the half-bridge formed from switching elements $T_1$ to $T_{2n}$ between the central terminal M of the half-bridge and the injected central voltage $U_M$, in which case, during the starting phase, the switching element $T_M$ is open in order to charge the capacitors and the charging current flows through the charging resistor $R_L$ and partly through reverse diodes into the switching elements $T_1$ to $T_n$ (which usually are already integrated into the switching elements and if necessary are formed by additional external diodes parallel to the switching elements) and, for operation of the half-bridge, the switching element $T_{Br}$ is closed. In both starting circuits A, B, it is also possible to dispense with the charging resistor $R_L$, by closing the respective switching element $T_{Br}$ (which is suitably designed for this purpose) slowly or incrementally during the starting phase. Alternatively, the respective charging resistor $R_L$ may also be designed as a varistor or as an active structural element (e.g. transistor) in both starting circuits A, B. Such a starting circuit is advantageous in particular for the switching topology with stabilizing resistors according to FIG. 4, but may also be provided advantageously in the other possible configurations of an inventive multi-level half-bridge or switching topologies based thereon.

Furthermore, in yet another improvement of the present invention, the capacitive switching-on losses and/or the ohmic switching-off losses at the switching elements can be reduced or minimized in preferred manner—by suitable configuration of the process of reversal between each two switched states—by establishing zero-voltage switching (zero-voltage switching-on) and/or zero-current switching (zero-current switching-off) of the individual switching elements $T_1, \ldots, T_{2n}$, by the fact that, especially while using parasitic and/or selectively interposed capacitors in connection with an inductor connected to the central terminal (M) and/or parasitic leakage inductance, the switching instant for closing the switching elements $T_1, \ldots, T_{2n}$ is selected such that, at this instant, the voltage at the switching element to be closed is zero or close to zero, and so capacitive switching-on losses are reduced, and/or the switching instant for opening the switching elements $T_1, \ldots, T_{2n}$ during resonant or intermittent operation or at the limit of intermittent operation is selected such that, at this instant, the current at the switching element to be opened is close to zero, and so ohmic switching-off losses are prevented.

This zero-voltage switching can be achieved in particular by the fact that, during opening of a previously closed switching element $T_1, \ldots, T_{2n}$, the variation of the central voltage $U_M$ as a function of time is measured with sufficiently high resolution and compared with the computationally expected voltage of the voltage level to be activated, and a switching delay as well as the switching instant for a switching element $T_1, \ldots, T_{2n}$ to be closed during the switching sequence is determined therefrom in such a way that, at that switching instant, the voltage at the switching element $T_1, \ldots, T_{2n}$ to be closed is zero or close to zero. Zero-current switching can be achieved in particular by the fact that the current flowing through the half-bridge is measured with such high resolution by means of an ammeter M3 at the central terminal or by one of the ammeters M1, M2 disposed at the ends of the two half-bridge branches Z1, Z2 leading to the terminals $A_1$, $A_2$ that the variation of the current through the current-carrying switching elements ($T_1, \ldots, T_{2n}$) is known therefrom, in which case a switching delay and the switching instant for the switching element $T_1, \ldots, T_{2n}$ to be opened during resonant or intermittent operation or at the limit of intermittent operation is determined from this current variation in such a way that, at that switching instant, the current at the switching element or elements $T_1, \ldots, T_{2n}$ to be opened is zero or close to zero.

Furthermore, it may be advantageously provided that a voltage and/or current variation approaching reality is determined computationally by interpolation, averaging and/or (fast) Fourier transformation from the voltage and/or current values measured in a defined time grid, and this is used for determination of the switching delay and of the appropriately corrected (for zero-current and/or zero-voltage switching) switching instants of the switching elements $T_1, \ldots, T_{2n}$ to be switched. Furthermore, it may be preferably provided that the voltage and/or current variation at the switching elements $T_1, \ldots, T_{2n}$ to be switched is calculated with consideration of known, possibly parasitic inductance and/or capacitance values and the known voltage levels and that this is used for determination of the switching delay and of the appropriately corrected switching instant of the switching elements $T_1, \ldots, T_{2n}$ to be switched, in which case the influence of temperature and/or voltage on the acting inductance and capacitance values is optionally taken into consideration by computation. The switching delay necessary for zero-voltage switching and/or zero-current switching of the switching elements $T_1, \ldots, T_{2n}$ to be switched may be expediently predetermined as a fixed value in the circuit and specifically either by switching technology in the circuit or by programming in a memory element integrated in the circuit or connected with the circuit, in which case the switching delay is optionally predetermined by consideration of the influence of the bridge voltage, of individual or several capacitor voltages, of the current at the terminals of the half-bridge and/or of the temperature of the relevant structural elements by means of a table of values, in which the values that depend on these influencing parameters and are necessary for control of the switching delays for opening and/or closing of the switching elements $T_1, \ldots, T_{2n}$ are programmed.

All aspects and preferred improvements relating to the inventive method are obviously equally applicable for the inventive electrical circuit in the form of a multi-level half-bridge that is set up to implement one of the methods explained in the foregoing.

Figure 5:
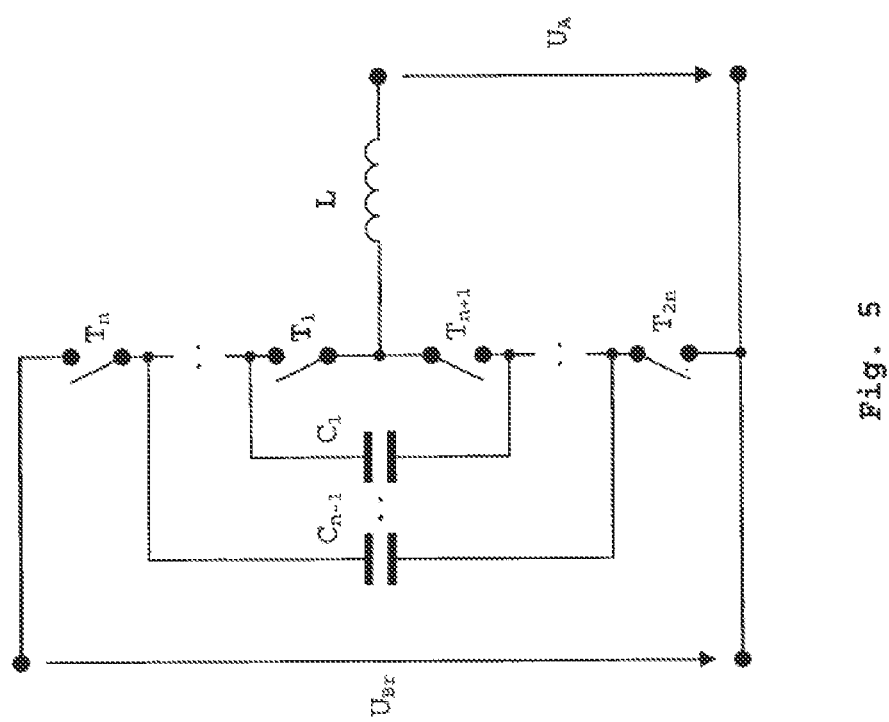
FIG. 5 shows an exemplary embodiment of a multi-level half-bridge of the inventive type used as a step-down converter.
Figure 6:
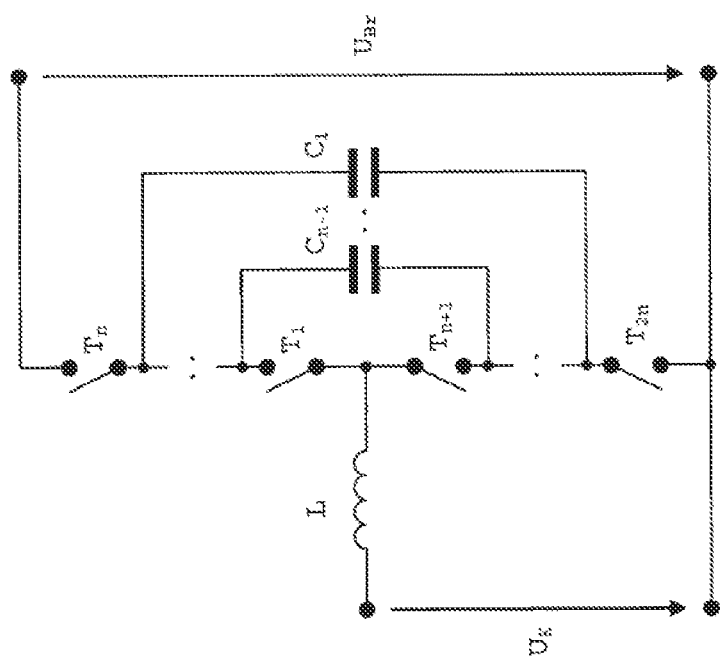
FIG. 6 shows an exemplary embodiment of a multi-level half-bridge of the inventive type used as a step-up converter.
Figure 7:
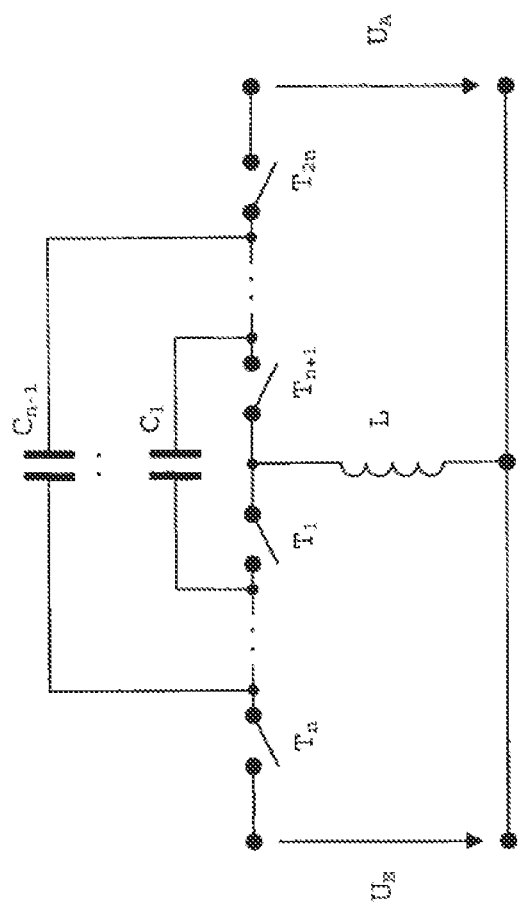
FIG. 7 shows an exemplary embodiment of a multi-level half-bridge of the inventive type used as an inverter.

When an inductor L connected to its central terminal M is used, such a multi-level half-bridge can serve particularly advantageously for use as a step-down converter (see FIG. 5), as a step-up converter (see FIG. 6) or as an inverter (see FIG. 7). This permits the advantage that the inductor used—in comparison with conventional step-down/step-up converters or inverters—is driven with much smaller voltage variations, and so it may be designed with smaller dimensions and it causes smaller losses. Furthermore, the bridging of relatively large voltage differences is possible with relatively small inductances and low losses. The multi-level half-bridge according to FIG. 7, used as an inverter, can also be operated in the inventive sense, since here the bridge voltage $U_{Br}$ is obtained as the difference between input voltage $U_E$ and (desired) output voltage $U_A$.

Figure 8:
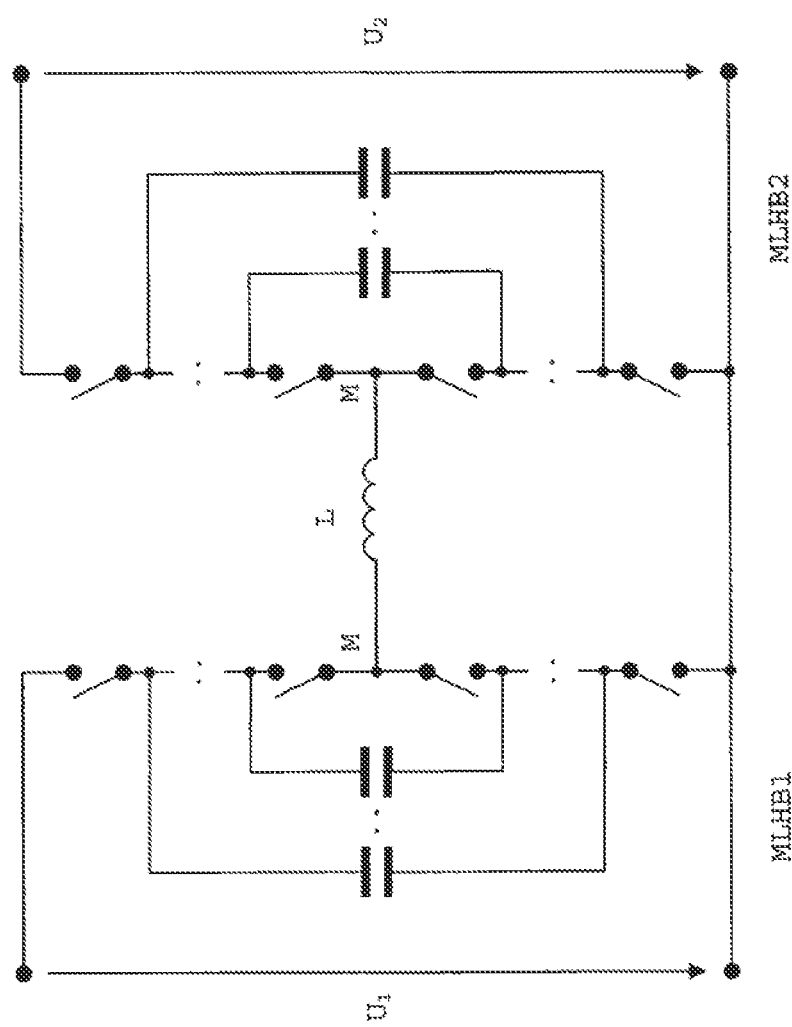
FIG. 8 shows an exemplary embodiment of a system with two multi-level half-bridges of the inventive type used as step-up and step-down converters.

FIG. 8 illustrates a further preferred configuration of the present invention, in which a system comprising two multi-level half-bridges MLHB1, MLHB2 is provided, in which the two multi-level half-bridges MLHB1, MLHB2 are connected via their respective central terminals M with a common inductor L, wherein both multi-level half-bridges MLHB1, MLHB2 can be operated as step-up or step-down converters, so that the system can be used as a bidirectional step-up and step-down converter for conversion of variable input voltages ($U_1$; $U_2$) into variable output voltages ($U_2$; $U_1$).

Figure 9:
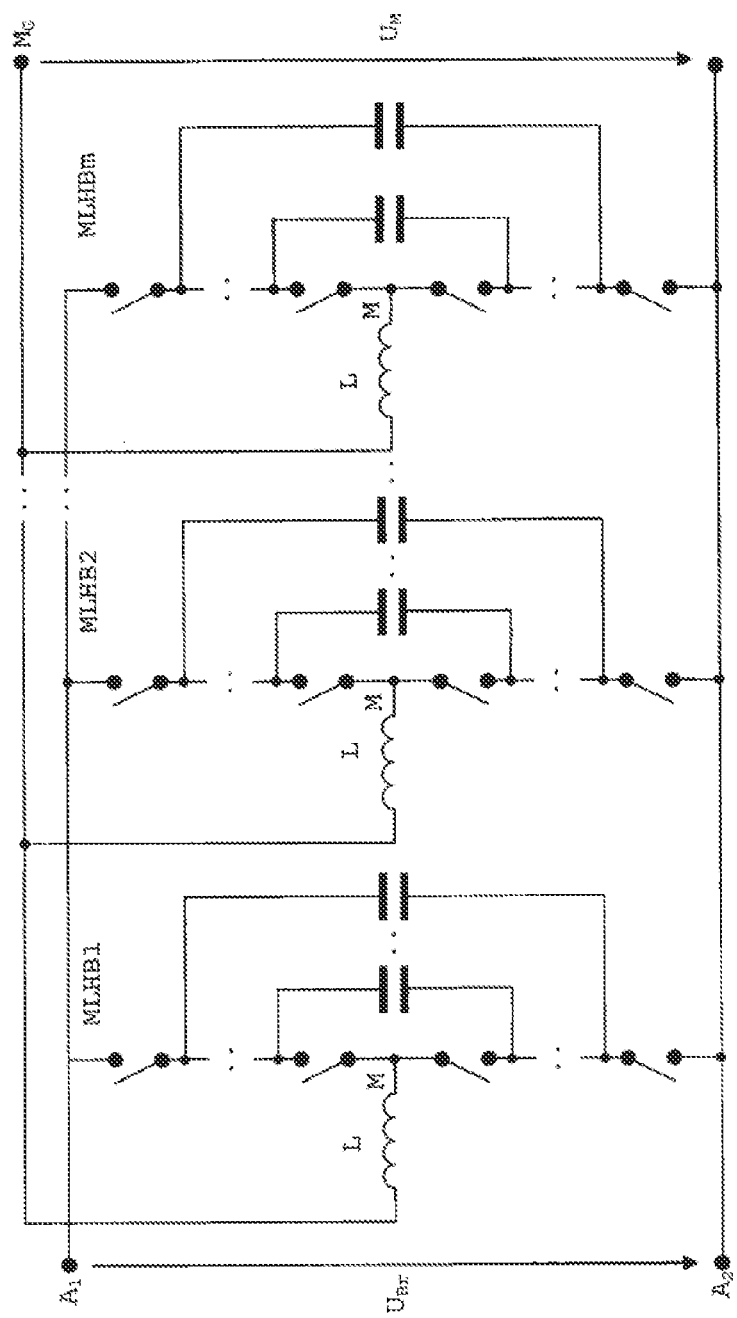
FIG. 9 shows an exemplary embodiment of a system with several multi-level half-bridges of the inventive type, which are interconnected in parallel and operated in phase-shifted mode.

Furthermore, within the context of the present invention, it is possible to construct a system, illustrated in FIG. 9, from a plurality of multi-level half-bridges MLHB1, MLHB2, ..., MLHBm, wherein the multi-level half-bridges MLHB1, MLHB2, ..., MLHBm are interconnected in parallel in such a way that a common bridge voltage $U_{Br}$ is applied to their respective terminals $A_1$, $A_2$ and that their respective central terminals M are connected via one inductor L each with a common central terminal $M_G$, in which case the individual multi-level half-bridges MLHB1, MLHB2, ..., MLHBm can be advantageously set up for phase-shifted operation, in which the phase shift between each two successive multi-level half-bridges MLHB1, MLHB2, ..., MLHBm is preferably 360°/m respectively, where m is the number of multi-level half-bridges MLHB1, MLHB2, ..., MLHBm (m>=2). In the case of a total of two multi-level half-bridges, therefore, a phase shift of 180° should be obtained, while in the case of three half-bridges, a phase shift of 120° each should be obtained, and so on. In such a system, a much more uniform current flow and more uniform energy transport in comparison to the prior art can be achieved in the context of load switching both on the input side and on the output side. To improve the efficiency at low power consumption, it can be optionally provided in such a system for the case of low power consumption that individual multi-level half-bridges are deactivated or not operated and thus are at almost zero current in order to reduce the power loss.

Figure 10:
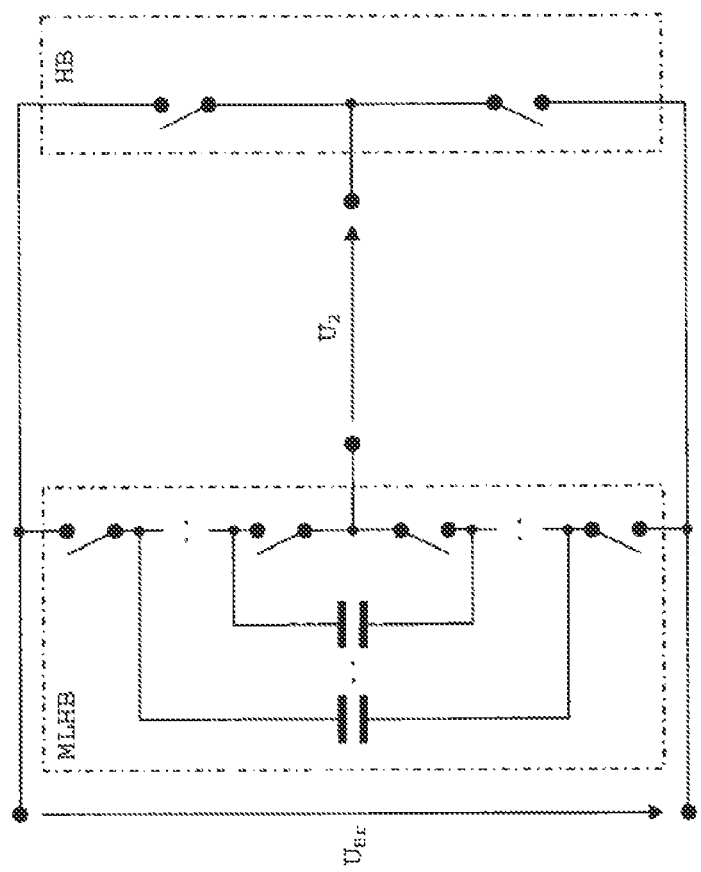
FIG. 10 shows an exemplary embodiment of a system with one multi-level half-bridge of the inventive type, which is interconnected with a simple half-bridge to form a full bridge.

In yet another preferred improvement of the invention, the system illustrated in FIG. 10, in which an inventive multi-level half-bridge MLHB and a simple half-bridge HB (comprising two switching elements with central output disposed between them) are interconnected as a full bridge, can be used for bipolar drive of current sources and/or current sinks, especially of various consuming loads, such as, for example, transformers or motors, with different voltage levels.

Figure 11:
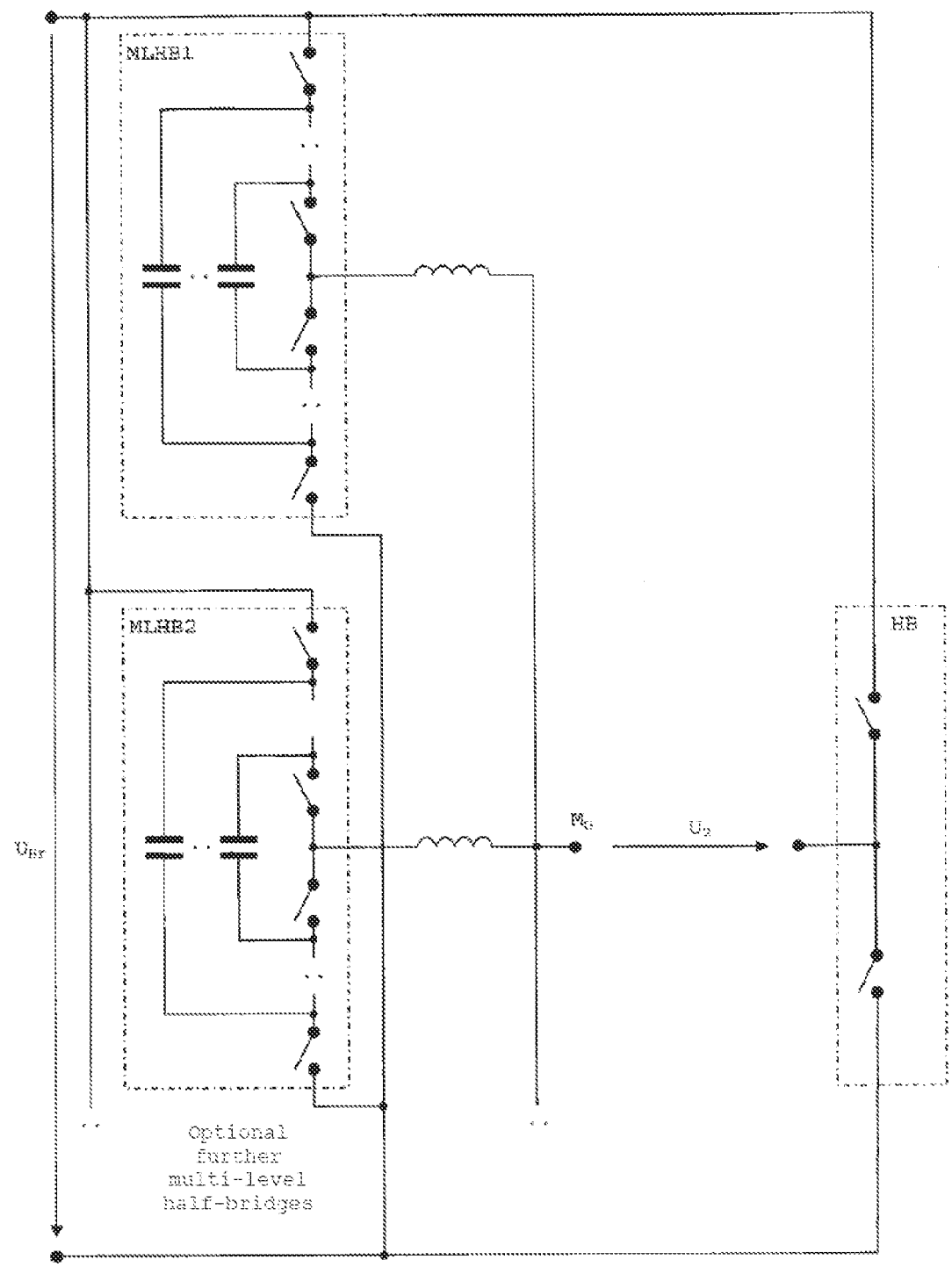
FIG. 11 shows an exemplary embodiment of a system in which several multi-level half-bridges of the inventive type are interconnected in parallel and interconnected with a simple half-bridge to form a full bridge.

Furthermore, the system illustrated in FIG. 9, comprising a plurality of inventive multi-level half-bridges in the sense of the illustration of FIG. 11, may likewise be interconnected with a simple half-bridge HB to obtain a full bridge, with which—in comparison with the full bridge illustrated in FIG. 10—even more uniform current flow and energy transport can be assured.

Figure 12:
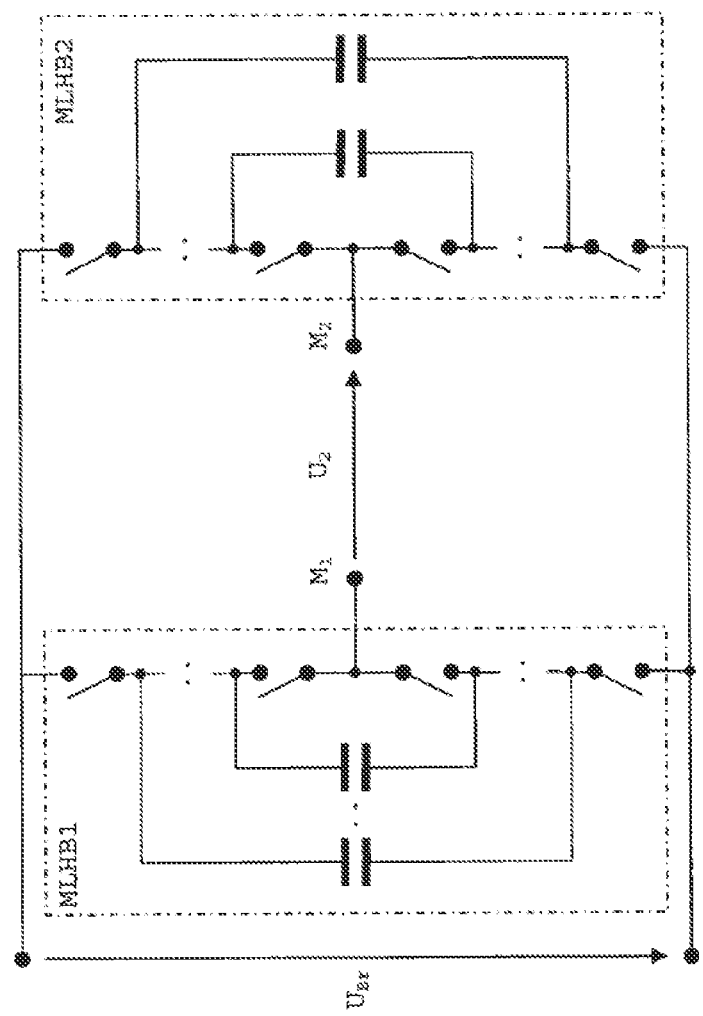
FIG. 12 shows an exemplary embodiment of a system in which two inventive half-bridges are interconnected to form a full bridge.

The circuit topology of FIG. 12, in which two multi-level half-bridges MLHB1, MLHB2 to which a common bridge voltage is applied are interconnected as a full bridge and are set up for operation in phase opposition, so that the half-bridge voltage $U_{Br}$ is always present on average at the two central terminals M1, M2, also proves to be advantageous, especially since such a full bridge exhibits better EMC behavior with considerably smaller radiated interference compared with the full bridge of FIG. 10 and can be used for bipolar—relative to the bridge voltage $U_{Br}$—symmetric drive of current sources and sinks, especially of various consuming loads such as transformers or motors with different voltage levels.

Figure 13:
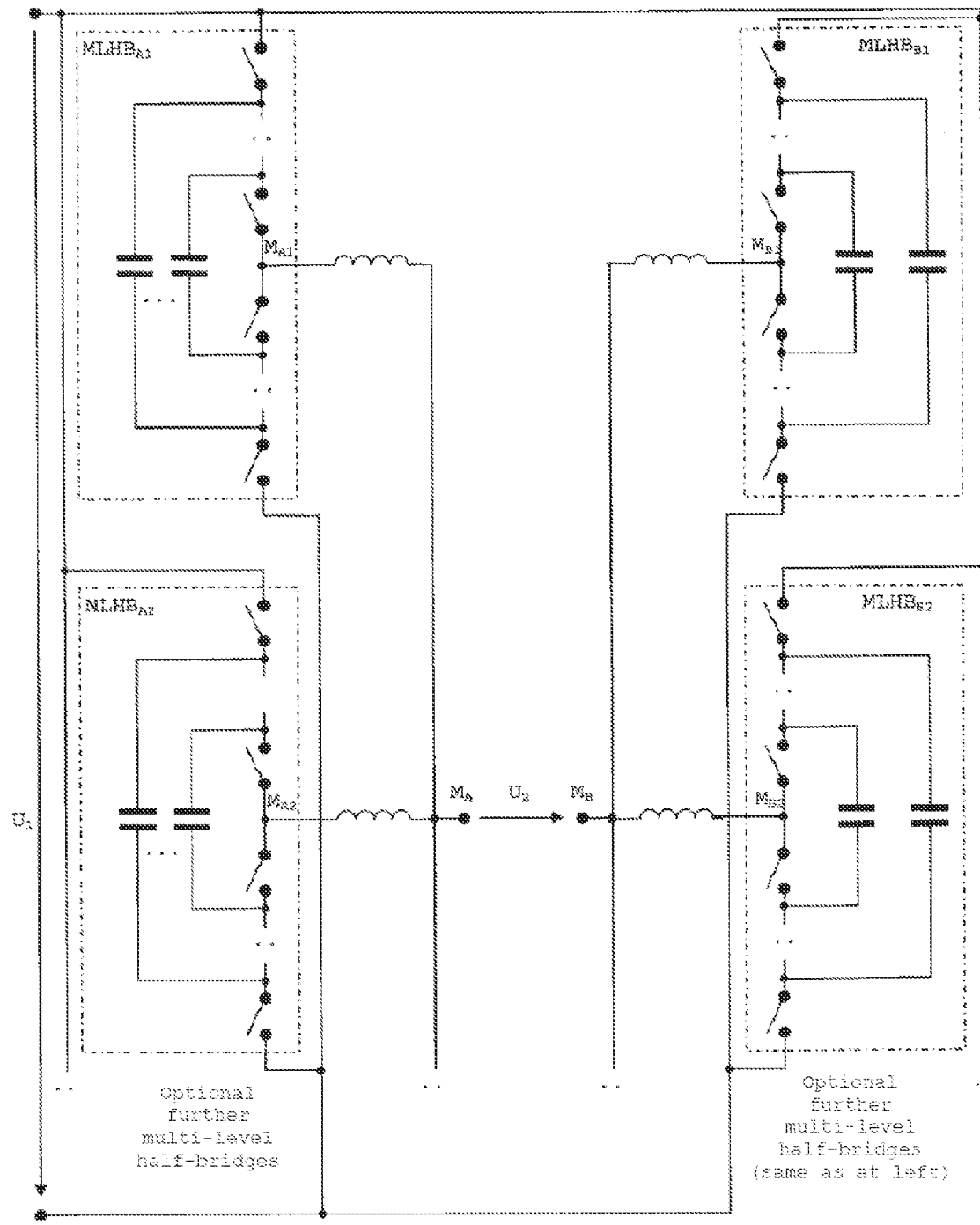
FIG. 13 shows an exemplary embodiment of a system comprising two (sub-)systems respectively comprising a plurality of inventive multi-level half-bridges according to FIG. 9, which are interconnected to form a full bridge.

On the other hand, the system of FIG. 13, in which a plurality of inventive multi-level half-bridges is interconnected as a full bridge, once again proves to be superior at higher powers. In this case a plurality of multi-level half-bridges $MLHB_{Ai}$, $MLHBa_{Bi}$ is respectively interconnected in parallel on both sides of the full bridge in such a way that all multi-level half-bridges $MLHB_{Ai}$, $MLHB_{Bi}$ are connected to a common bridge voltage $U_1$, wherein the central terminals $M_{Ai}$, $M_{Bi}$ of the multi-level half-bridges $MLHB_{Ai}$, $MLHB_{Bi}$ disposed on each side of the full bridge are respectively connected via an inductor to a common central terminal $M_A$, $M_B$, so that a voltage $U_2$ is present between the central terminals $M_A$, $M_B$ of the two sides of the full bridge. These individual multi-level half-bridges $MLHB_{Ai}$, $MLHB_{Bi}$ are set up for phase-shifted operation, in which the phase shift between each two successive multi-level half-bridges $MLHB_{Ai}$, $MLHB_{Bi}$ on each side of the full bridge is preferably 360°/m respectively, where m is the respective number of multi-level half-bridges $MLHB_{Ai}$, $MLHB_{Bi}$ on each side of the full bridge. In this case it is then provided that the multi-level half-bridges $MLHB_{Ai}$, $MLHB_{Bi}$ disposed on various sides of the full bridge are set up for operation in phase opposition, so that the half-bridge voltage $U_1$ is always present on average at the two central terminals $M_A$, $M_B$. Here also it may be advantageously provided that individual ones of the multi-level half-bridges may optionally not be operated, in order, for example, to reduce the power loss of the system at low power consumption.

Figure 14:
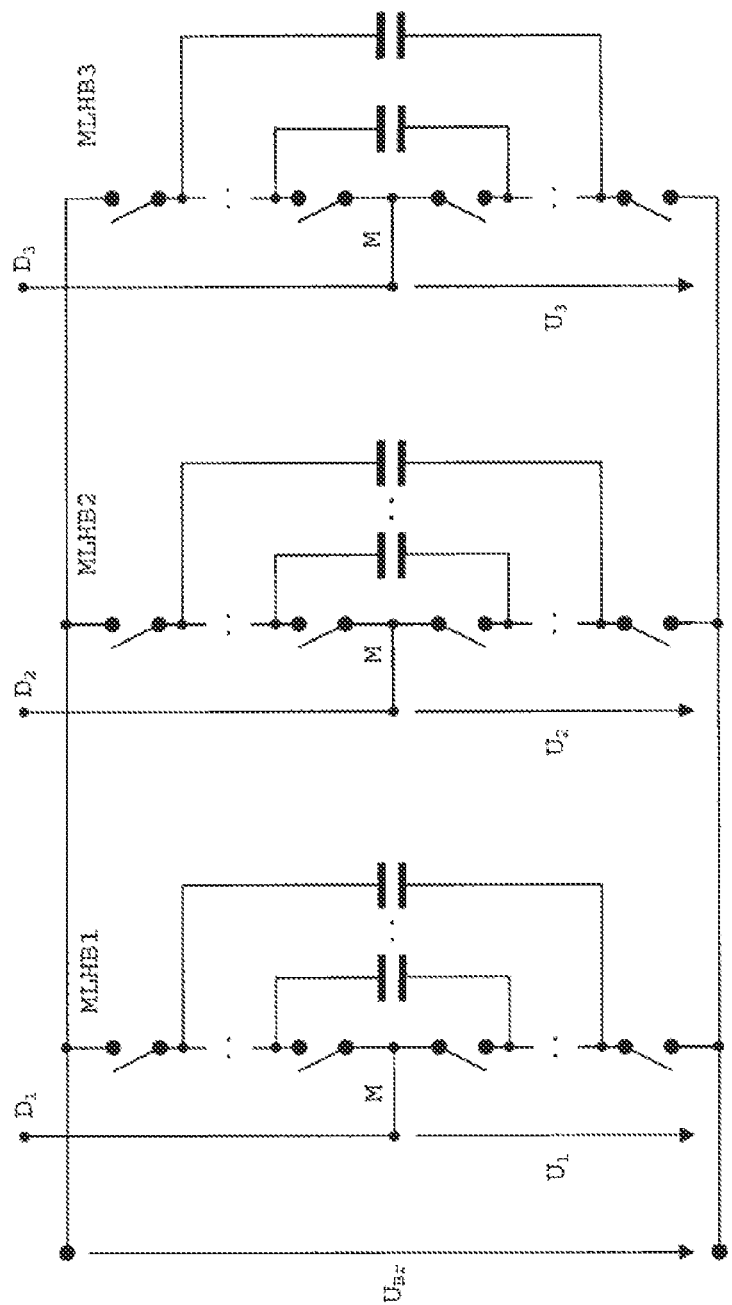
FIG. 14 shows an exemplary embodiment of a multi-level rotating-current current bridge composed of three inventive multi-level half-bridges.

A further circuit topology based on the present invention relates to the system illustrated in FIG. 14, in which three multi-level half-bridges MLHB1, MLHB2, MLHB3 are interconnected as a multi-level rotating-current bridge and which is characterized in that the three multi-level half-bridges MLHB1, MLHB2, MLHB3 are interconnected in parallel in such a way that all multi-level half-bridges MLHB1, MLHB2, MLHB3 are connected to a common bridge voltage $U_{Br}$, wherein the three multi-level half-bridges MLHB1, MLHB2, MLHB3 are operated with a phase shift of respectively 120° and wherein the central terminals M of the multi-level half-bridges MLHB1, MLHB2, MLHB3 respectively drive one of three rotating-current terminals $D_1$, $D_2$, $D_3$. Hereby it is possible to drive a three-phase rotating-current terminal, which therefore can be operated bidirectionally (i.e. as a source or as a sink) and in a manner that compensates for reactive power.

Figure 15:
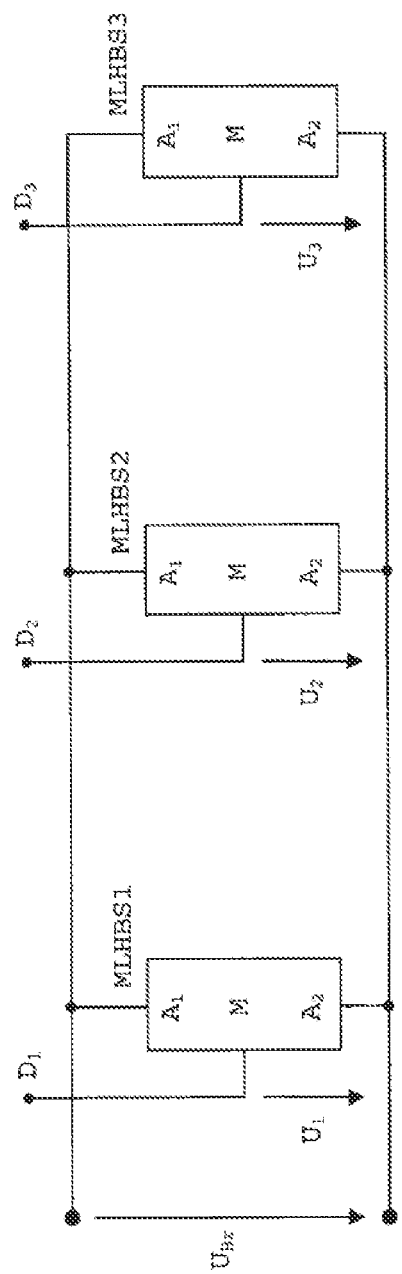
FIG. 15 shows an exemplary embodiment of a further multi-level rotating-current current bridge, in which the three systems according to FIG. 9 are suitably interconnected.

On the other hand, as regards the attainable uniformity of current flow and energy transport in the case of higher powers, it is also possible, in yet another improved way corresponding to the circuit sketch in FIG. 15, to interconnect three systems MLHBS1, MLHBS2, MLHBS3—each comprising a plurality of inventive multi-level half-bridges—according to FIG. 9 as a multi-level rotating-current bridge, by interconnecting the three systems MLHBS1, MLHBS2, MLHBS3 in parallel in such a way that all systems MLHBS1, MLHBS2, MLHBS3 are connected to a common bridge voltage $U_{Br}$, and by operating the three systems MLHBS1, MLHBS2, MLHBS3 relative to one another with a phase shift of respectively 120°, wherein the central terminals M of the three systems MLHBS1, MLHBS2, MLHBS3 respectively drive one of three rotating-current terminals $D_1$, $D_2$, $D_3$.

Figure 16:
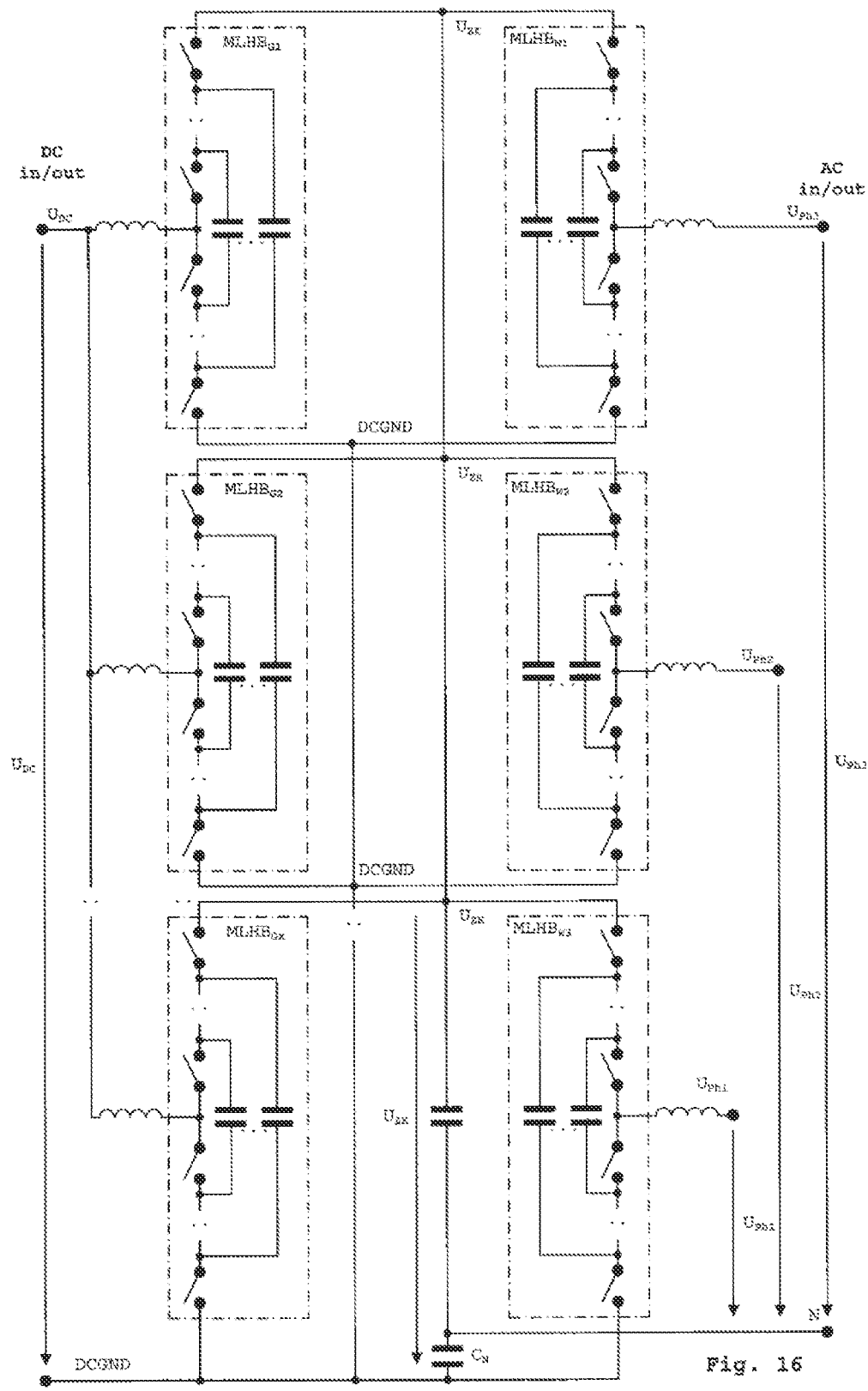
FIG. 16 shows a multi-level DC/AC converter system comprising a plurality of inventive and suitably interconnected multi-level half-bridges.

And, finally, it is possible with inventive multi-level half-bridges to construct DC/AC converter systems that are even more improved in many respects, as shown in FIG. 16. This system is characterized in that one or more multi-level half-bridges $MLHB_{G1}, \ldots, MLHB_{GX}$ functioning as step-up converters with central terminal M respectively lying at DC potential $U_{DC}$ are interconnected in parallel on the direct-current side (DC) and in that, in the case of use of several multi-level half-bridges on the DC side, the multi-level half-bridges $MLHB_{G1}, \ldots, MLHB_{GX}$ on the DC side are set up for phase-shifted operation in the sense already explained in the foregoing. On the alternating-current side (AC), one or more multi-level half-bridges $MLHB_{W1}, \ldots, MLHB_{WX}$ functioning as step-down converters are interconnected. The same intermediate-circuit voltage $U_{ZK}$ is respectively applied to their terminals $A_1$, $A_2$, while their central terminals M lie at an AC potential $U_{Ph1}$, $U_{Ph2}$, $U_{Ph3}$. The intermediate-circuit voltage $U_{ZK}$ corresponds to the bridge voltage of the multi-level half-bridges $MLHB_{G1}, \ldots, MLHB_{GX}$ on the DC side and, in the case of use of several multi-level half-bridges $MLHB_{W1}, \ldots, MLHB_{WX}$ on the AC side, these can be interconnected as multi-level rotating-current bridges and set up for appropriately phase-shifted operation. The capacitor $C_N$ illustrated at the bottom right in FIG. 16 provides the zero-point shift necessary for DC/AC conversion.

Special advantages of this system are the high DC voltage range ($U_{DC}$) up to at most the intermediate-circuit voltage, the possibility of bidirectional energy transmission from the DC side ($U_{DC}$) to the AC side ($U_{P1h}$-$U_{Ph3}$), the possibility of extensive use of identical parts and modularization of the arrangement and the resulting good suitability as photovoltaic converters, charging converters, uninterruptible power supplies (UPS), respectively with a broad, bidirectional voltage range, reactive-power compensation and high efficiency.

What is claimed is:

1. A method for operation of an electrical circuit in the form of a multi-level half-bridge (MLHB)
   wherein the circuit has a connection, via two branches (Z1, Z2) meeting at a central terminal (M), of two terminals ($A_1$, $A_2$), at which a bridge voltage ($U_{Br}$) is present,
   wherein a central voltage ($U_M$) relative to the potential of one of the terminals ($A_1$, $A_2$) is present at the central terminal (M),
   wherein the branches (Z1, Z2) formed symmetrically relative to the central terminal (M) respectively have a number n of switching elements ($T_1, \ldots, T_n$; $T_{n+1}, \ldots, T_{2n}$) connected in series,
   wherein the connection points ($V_i$; $i \in \{1, \ldots, n-1\}$) between each two adjacent switching elements ($T_i$, $T_{i+1}$) of the first branch (Z1) are respectively connected via a capacitor ($C_i$) with the connection points ($V_{n+i}$), disposed symmetrically relative to the central terminal (M), between each two switching elements ($T_{n+i}$, $T_{n+i+1}$) of the second branch, and
   wherein the switching elements ($T_1, \ldots, T_{2n}$) are switchable to various switched states ($Z_i$) by using a control unit, characterized by the following steps:
   A) at given bridge voltage ($U_{Br}$), specification of a desired central voltage ($U_M$), which is selected exclusively from n+1 various voltage levels (N) corresponding to p times the value of the n-th part of the bridge voltage ($U_M = p/n \times U_{Br}$), wherein p is an integer such that $0 \leq p \leq n$, or
       at given central voltage ($U_M$) with $U_M \neq 0$, specification of a desired bridge voltage ($U_{Br}$), which is selected exclusively from n different voltage levels corresponding to n times the value of the p-th part of the central voltage ($U_{Br} = n/p \times U_M$), wherein p is an integer such that $1 \leq p \leq n$,
   B) operation of the circuit in a regulated mode, as long as a new central voltage ($U_M$) or a new bridge voltage ($U_{Br}$) will not be selected in accordance with step A) from the said voltage levels, in which regulated mode
       initially all capacitors ($C_i$) are charged to an integral multiple of the n-th part of the bridge voltage ($U_{Br}$), so that the voltage $U_{Ci}$ at each capacitor ($C_i$) takes on the value $U_{Ci} = i/n \times U_{Br}$,
       each switching element ($T_1, \ldots, T_{2n}$) in opened state is respectively exposed to the n-th part of the bridge voltage ($U_{Br}$), and
       the desired central voltage ($U_M$) or the desired bridge voltage ($U_{Br}$), except in the cases of $U_M = 0$ or $U_M = U_{Br}$, is maintained by establishment of a sequence, grouped into switching cycles, of various switched states ($Z_i$) of the switching elements ($T_1, \ldots, T_{2n}$) respectively providing the desired central voltage ($U_M$) or the desired bridge voltage ($U_{Br}$),
       wherein each switching cycle comprises a predetermined number of various switched states ($Z_i$), which at constant load on the multi-level half-bridge (MLHB) are respectively active for the same duration and for the same number of times over a complete switching cycle, and also are selected in such a way that each capacitor ($C_1, \ldots C_{n-1}$) is charged and discharged for the same duration and for the same number of times in each switching cycle,
       wherein, during a changeover between the two adjacent voltage levels of the central voltage ($U_M$) or of the bridge voltage ($U_{Br}$), the first switched state ($Z_i$) to be adjusted for the new voltage level is selected as a function of the switched state ($Z_j$) adjusted previously for the other voltage level, in such a way that, during the changeover between the said switched states, respectively only one switching element ($T_1, \ldots, T_n$; $T_{n+1}, \ldots, T_{2n}$) per branch (Z1, Z2) is reversed.

2. The method of claim 1, wherein:
   in step B), at each predetermined voltage level of the central voltage ($U_M$) or of the bridge voltage ($U_{Br}$), except for $U_M = 0$ and $U_M = U_{Br}$, each switching cycle comprises exactly n switched states, which are selected such that, at constant load at the central output in each switching cycle, each capacitor ($C_1, \ldots, C_{n-1}$) is charged and discharged exactly one time, and that, in each switched state of a switching cycle, respectively at most two capacitors are charged and/or discharged simultaneously.

3. The method of claim 1, wherein:
   the order of the switched states ($Z_i$) within a switching cycle is selected in such a way that, during the changeover between two successive switched states ($Z_i$) of a voltage level, always only at most two switching elements ($T_1, \ldots, T_n$; $T_{n+1}, \ldots, T_{2n}$) of each branch (Z1, Z2) are respectively switched on and/or off.

4. The method of claim 1, wherein:
   in the repeated changeover between two adjacent voltage levels, respectively a switching element ($T_1, \ldots, T_{2n}$) other than that in the previous changeover is reversed per branch (Z1, Z2).

5. The method of claim 1, wherein:
   the switched states ($Z_1, \ldots, Z_n$) according to the table in FIG. 2 that depend on the selected central voltage ($U_M$) or on the selected bridge voltage ($U_{Br}$) are used in sequence in step B) in each switching cycle provided for a defined voltage level.

6. The method of claim 5, wherein:
   for the changeover between each two adjacent voltage levels, respectively only one switching element ($T_1, \ldots, T_{2n}$) per branch (Z1, Z2) is reversed, wherein either the switched state ($Z_i$) is preserved during the changeover to the next higher voltage level and the switched state is incremented by one to the switched state ($Z_{i+1}$) during the changeover to the next lower voltage level, in which case ($Z_{n+1}$) to ($Z_1$) is defined,
   or the switched state ($Z_i$) is decremented by one to the switched state ($Z_{i-1}$) during the changeover to the next higher voltage level, in which case ($Z_0$) to ($Z_n$) is defined, and the switched state ($Z_i$) is preserved during the changeover to the next lower voltage level.

7. The method of claim 1, wherein:
   in step B), during the various switched states (4) of a voltage cycle, respectively the exact bridge voltage ($U_{Br}$) and the exact central voltage ($U_M$) are measured and all capacitor voltages ($U_{Ci}$) are calculated from this by means of a system of linear equations after the passage through n−1 different switched states ($Z_i$).

8. The method of claim 7, wherein:
   the current flowing through the half-bridge is measured by means of an ammeter ($M_3$) at the central terminal or by an ammeter ($M_1$, $M_2$) disposed at each end of the two half-bridge branches (Z1, Z2) leading to the terminals ($A_1$, $A_2$), and in that the capacitor charge reversals during a switching cycle are calculated therefrom by discrete integration ($\Delta U = I/C \times \Delta t$).

9. The method of claim 7, wherein:

the values calculated for the capacitor voltages ($U_{Ci}$) and/or the values calculated for the capacitor charge reversals are used in the case of a deviation from the target values ($U_{Ci} = i/n \times U_{Br}$), for adaptive modification of the order and/or of the duration of the switched states ($Z_i$).

10. The method of claim 1, wherein:

stabilizing resistors ($R_1$, ..., $R_{2n}$), varistors or active switching parts are arranged in parallel with the switching elements ($T_1$, ..., $T_{2n}$), so that substantially equal charging of the capacitors ($C_1$, ..., $C_{n-1}$) and distribution of the blocking voltage present at the individual switching elements ($T_1$, ..., $T_{2n}$) can be achieved with opened switching elements ($T_1$, ..., $T_{2n}$), wherein, preferably during injection of a given bridge voltage ($U_{Br}$), a starting circuit A between the half-bridge formed from the switching elements ($T_1$, ..., $T_{2n}$) and the given bridge voltage ($U_{Br}$) and/or, during injection of a given central voltage ($U_M$), a starting circuit B is disposed between the central terminal (M) of the half-bridge and the given central voltage ($U_M$), by means of which the multi-level half-bridge is brought slowly or incrementally to operating voltage, in order to avoid overshoot of the permissible blocking voltage at the switching elements, especially the outer switching elements $T_n$ and $T_{2n}$.

11. The method of claim 1, wherein zero-voltage switching (zero-voltage switching-on) or zero-current switching (zero-current switching-off) of the individual switching elements ($T_1$, ..., $T_{2n}$) is established, by the fact that, especially while using parasitic and/or selectively interposed capacitors in connection with an inductor connected to the central terminal (M) and/or parasitic leakage inductance, the switching instant for closing the switching elements ($T_1$, ..., $T_{2n}$) is selected such that, at this instant, the voltage at the switching element to be closed is zero or close to zero, and so capacitive switching-on losses are reduced, and/or the switching instant for opening the switching elements ($T_1$, ..., $T_{2n}$) during resonant or intermittent operation or at the limit of intermittent operation is selected such that, at this instant, the current at the switching element to be opened is close to zero, and so ohmic switching-off losses are prevented.

12. The method of claim 11 with zero-voltage switching, wherein:

during opening of a previously closed switching element ($T_1$, ..., $T_{2n}$), the variation of the central voltage ($U_M$) as a function of time is measured with sufficiently high resolution and compared with the computationally expected voltage of the voltage level to be activated, and a switching delay as well as the switching instant for a switching element ($T_1$, ..., $T_{2n}$) to be closed is determined therefrom in such a way that, at that switching instant, the voltage at the switching element ($T_1$, ..., $T_{2n}$) to be closed is zero or close to zero.

13. The method of claim 11 with zero-current switching, wherein:

the current flowing through the half-bridge is measured with such high resolution by means of an ammeter (M3) at the central terminal or by one of the ammeters (M1; M2) disposed at the ends of the two half-bridge branches leading to the terminals ($A_1$, $A_2$) that the variation of the current through each switching element ($T_1$, ..., $T_{2n}$) is known therefrom, in which case a switching delay and the switching instant for the switching element ($T_1$, ..., $T_{2n}$) to be opened during resonant or intermittent operation or at the limit of intermittent operation is determined from this current variation in such a way that, at that switching instant, the current at the switching element ($T_1$, ..., $T_{2n}$) to be opened is zero or close to zero.

14. The method of claim 11, wherein:

a voltage and/or current variation approaching reality is determined computationally by interpolation, averaging or (fast) Fourier transformation from the voltage or current values measured in a defined time grid, and this is used for determination of the switching delay and of the switching instants of the switching elements ($T_1$, ..., $T_{2n}$) to be switched.

15. The method of claim 11, wherein:

the voltage or current variation at the switching elements ($T_1$, ..., $T_{2n}$) to be switched is calculated with consideration of known, possibly parasitic inductance or capacitance values and the known voltage levels and in that this is used for determination of the switching delay and of the switching instant of the switching elements ($T_1$, ..., $T_{2n}$) to be switched, in which case the influence of temperature and/or voltage on the acting inductance and capacitance values is optionally taken into consideration by computation.

16. The method of claim 11, wherein:

the switching delay necessary for zero-voltage switching or zero-current switching of the switching elements ($T_1$, ..., $T_{2n}$) to be switched is predetermined as a fixed value in the circuit, and specifically either by switching technology in the circuit or by programming in a memory element integrated in the circuit or connected with the circuit, in which case the switching delay is optionally predetermined by consideration of the influence of the bridge voltage, of individual or several capacitor voltages, of the current at the terminals of the half-bridge and/or of the temperature of the relevant structural elements by means of a table of values, in which the values that depend on these influencing parameters and are necessary for control of the switching delays for opening and/or closing of the switching elements ($T_1$, ..., $T_{2n}$) are programmed.

17. An electrical circuit in the form of a multi-level half-bridge (MLHB), wherein the circuit has a connection, via two branches (Z1, Z2) meeting at a central terminal (M), of two terminals ($A_1$, $A_2$), at which a bridge voltage ($U_{Br}$) is present, wherein a central voltage ($U_M$) relative to the potential of one of the terminals ($A_2$) is present at the central terminal (M), wherein the branches (Z1, Z2) formed symmetrically relative to the central terminal (M) respectively have a number n of switching elements ($T_1$, ..., $T_n$; $T_{n+1}$, ..., $T_{2n}$) connected in series, wherein the connection points ($V_i$; $i \in \{1, ..., n-1\}$) between each two adjacent switching elements ($T_i$, $T_{i+1}$) of the first branch (Z1) are respectively connected via a capacitor ($C_i$) with the connection points ($V_{n+i}$), disposed symmetrically relative to the central terminal (M), between each two switching elements ($T_{n+i}$, $T_{n+i+1}$) of the second branch, and wherein the switching elements ($T_1, \ldots, T_{2n}$) are switchable to various switched states ($Z_i$) by using a control unit, characterized in that the circuit, especially its control unit, is set up for implementation of a method or of several methods according to claim 1.

18. The multi-level half-bridge (MLHB) of claim 17, with an inductor (L) connected to a central terminal (M), wherein this arrangement is operated as a step-down converter, by the fact that an input voltage is injected as the bridge voltage ($U_{Br}$) at the outer terminals ($A_1$, $A_2$) of the half-bridge and a lower output voltage ($U_A$) is drawn at the second terminal of the inductor not connected with the half-bridge, or is operated as a step-up converter, by the fact that an input voltage ($U_E$) is injected at the second terminal of the inductor not connected with the half-bridge and a higher output voltage ($U_{Br}$) is drawn at the outer terminals ($A_1$, $A_2$) of the half-bridge, or is operated as an inverter, by the fact that an input voltage ($U_E$) is injected at one of the two outer terminals ($A_1$, $A_2$) of the half-bridge and an output voltage ($U_A$) with polarity opposite that of the input voltage is drawn at the other of the outer terminals ($A_1$, $A_2$).

19. A system comprising two multi-level half-bridges (MLHB1, MLHB2) of claim 17, wherein:

the two multi-level half-bridges (MLHB1, MLHB2) are connected via their respective central terminals (M) with a common inductor (L), wherein both multi-level half-bridges (MLHB1, MLHB2) can be operated as step-up or step-down converters, so that the system can be used as a bidirectional step-up and step-down converter for conversion of variable input voltages ($U_1$; $U_2$) into variable output voltages ($U_2$; $U_1$).

20. A system comprising a plurality of multi-level half-bridges (MLHB) of claim 17, wherein:

the multi-level half-bridges (MLHB1, MLHB2, ..., MLHBm) are interconnected in parallel in such a way that a common bridge voltage ($U_{Br}$) is applied to their respective terminals ($A_1$, $A_2$) and that their respective central terminals (M) are connected via one inductor (L) each with a common central terminal ($M_G$), and in that the individual multi-level half-bridges (MLHB1, MLHB2, ..., MLHBm) are set up for phase-shifted operation, in which the phase shift between each two successive multi-level half-bridges (MLHB1, MLHB2, ..., MLHBm) is preferably 360°/m respectively, where m is the number of multi-level half-bridges (MLHB1, MLHB2, ..., MLHBm).

21. A system comprising three systems (MLHBS1; MLHBS2; MLHBS3) of claim 20, interconnected as a multi-level rotating-current bridge, respectively comprising a plurality of multi-level half-bridges (MLHB), wherein:

the three systems (MLHBS1; MLHBS2; MLHBS3) are interconnected in parallel in such a way that all systems (MLHBS1; MLHBS2; MLHBS3) are connected to a common bridge voltage ($U_{Br}$), wherein the three systems (MLHBS1; MLHBS2; MLHBS3) are operated with a phase shift of respectively 120° relative to one another and wherein the central terminals (M) of the three systems (MLHBS1; MLHBS2; MLHBS3) respectively drive one of three rotating-current terminals ($D_1$, $D_2$, $D_3$).

22. A system comprising a multi-level half-bridge (MLHB) of claim 17 and a simple half-bridge (HB) comprising two switching elements, wherein:

the multi-level half-bridge (MLHB) and the simple half-bridge (HB) are interconnected as a full bridge.

23. A system comprising a plurality of multi-level half-bridges (MLHB) of claim 17 and a simple half-bridge (HB) comprising two switching elements, wherein:

these multi-level half-bridges (MLHB) form a system, which in turn is interconnected with the simple half-bridge (HB) to obtain a full bridge.

24. A system comprising two multi-level half-bridges (MLHB1, MLHB2) of claim 17, wherein:

the two multi-level half-bridges (MLHB1, MLHB2) are interconnected as a full bridge and are set up for operation in phase opposition, so that the half-bridge voltage ($U_{Br}$) is always present on average at the two central terminals (M1, M2).

25. A system comprising a plurality of multi-level half-bridges of claim 17, interconnected as a full bridge, wherein:

a plurality of multi-level half-bridges ($MLHB_{Ai}$; $MLHB_{Bi}$) is respectively interconnected in parallel on both sides of the full bridge in such a way that all multi-level half-bridges ($MLHB_{Ai}$; $MLHB_{Bi}$) are connected to a common bridge voltage ($U_1$), wherein the central terminals ($M_{Ai}$; $M_{Bi}$) of the multi-level half-bridges ($MLHB_{Ai}$; $MLHB_{Bi}$) disposed on each side of the full bridge are respectively connected via an inductor to a common central terminal ($M_A$; $M_B$), so that a voltage ($U_2$) is present between the central terminals ($M_A$; $M_B$) of the two sides of the full bridge, wherein the individual multi-level half-bridges ($MLHB_{Ai}$; $MLHB_{Bi}$) are set up for phase-shifted operation, in which the phase shift between each two successive multi-level half-bridges ($MLHB_{Ai}$; $MLHB_{Bi}$) on each side of the full bridge is preferably 360°/m respectively, where m is the respective number of multi-level half-bridges ($MLHB_{Ai}$; $MLHB_{Bi}$), and wherein the multi-level half-bridges ($MLHB_{Ai}$; $MLHB_{Bi}$) disposed on various sides of the full bridge are set up for operation in phase opposition, so that the half-bridge voltage ($U_1$) is always present on average at the two central terminals ($M_A$; $M_B$).

26. A system comprising three multi-level half-bridges (MLHB1, MLHB2, MLHB3) according to claim 17, interconnected as a multi-level rotating-current bridge, wherein:

the three multi-level half-bridges (MLHB1, MLHB2, MLHB3) are interconnected in parallel in such a way that all multi-level half-bridges (MLHB1, MLHB2, MLHB3) are connected to a common bridge voltage ($U_{Br}$), wherein the three multi-level half-bridges (MLHB1, MLHB2, MLHB3) are operated with a phase shift of respectively 120° and wherein the central terminals (M) of the multi-level half-bridges (MLHB1, MLHB2, MLHB3) respectively drive one of three rotating-current terminals ($D_1$, $D_2$, $D_3$).

27. The use of an electrical circuit in the form of a multi-level half-bridge (MLHB) of claim 17 in a motor controller, in a converter or inverter, in a power network component, in a DC/DC converter or in a charging application.

* * * * *